US012232244B2

(12) United States Patent
Driessen

(10) Patent No.: US 12,232,244 B2
(45) Date of Patent: Feb. 18, 2025

(54) TARGET SUPPLY CONTROL APPARATUS AND METHOD IN AN EXTREME ULTRAVIOLET LIGHT SOURCE

(71) Applicant: ASML Netherlands B.V., Veldhoven (NL)

(72) Inventor: Theodorus Wilhelmus Driessen, Asten-Heusden (NL)

(73) Assignee: ASML Netherlands B.V., Veldhoven (NL)

( * ) Notice: Subject to any disclaimer, the term of this patent is extended or adjusted under 35 U.S.C. 154(b) by 487 days.

(21) Appl. No.: 17/428,814

(22) PCT Filed: Feb. 7, 2020

(86) PCT No.: PCT/EP2020/053104
§ 371 (c)(1),
(2) Date: Aug. 5, 2021

(87) PCT Pub. No.: WO2020/173683
PCT Pub. Date: Sep. 3, 2020

(65) Prior Publication Data
US 2022/0104335 A1 Mar. 31, 2022

Related U.S. Application Data

(60) Provisional application No. 62/810,673, filed on Feb. 26, 2019.

(51) Int. Cl.
*H01J 37/153* (2006.01)
*H05G 2/00* (2006.01)

(52) U.S. Cl.
CPC ............ *H05G 2/006* (2013.01); *H05G 2/005* (2013.01)

(58) Field of Classification Search
CPC ..... H05G 2/006; H05G 2/005; G03F 7/70033
(Continued)

(56) References Cited

U.S. PATENT DOCUMENTS 7,897,947 B2 3/2011 Vaschenko
8,158,960 B2 4/2012 Vaschenko et al.
(Continued)

FOREIGN PATENT DOCUMENTS

CN 103748967 A 4/2014
CN 108353489 A 7/2018
(Continued)

OTHER PUBLICATIONS

Chiara Giovanardi, European International Searching Authority, International Search Report and Written Opinion, counterpart PCT Application No. PCT/EP2020/053104, mailed Jun. 30, 2020, 22 pages total.

(Continued)

*Primary Examiner* — Jason L McCormack
(74) *Attorney, Agent, or Firm* — DiBerardino McGovern IP Group LLC

(57) ABSTRACT

A target apparatus (300) for an extreme ultraviolet (EUV) light source includes a target generator, a sensor module (130), and a target generator controller (325). The target generator includes a reservoir (115) configured to contain target material (114) that produces EUV light in a plasma state and a nozzle structure (117) in fluid communication with the reservoir. The target generator defines an opening (119) in the nozzle structure through which the target material received from the reservoir is released. The sensor module is configured to: detect an aspect relating to target material released from the opening as the target material travels along a trajectory toward a target space (112), and produce a one-dimensional signal from the detected aspect.

(Continued)

The target generator controller is in communication with the sensor module and the target generator, and is configured to modify characteristics of the target material based on an analysis of the one-dimensional signal.

33 Claims, 15 Drawing Sheets

(58) Field of Classification Search
USPC ...................................................... 250/504 R
See application file for complete search history.

(56) References Cited

U.S. PATENT DOCUMENTS

| | | | | |
|---|---|---|---|---|
| 8,808,923 | B2 | 8/2014 | Nakagiri et al. | |
| 2004/0105095 | A1 | 6/2004 | Stobrawa et al. | |
| 2010/0258750 | A1 | 10/2010 | Partlo et al. | |
| 2013/0043401 | A1 | 2/2013 | Graham et al. | |
| 2014/0284502 | A1 | 9/2014 | Nakano et al. | |
| 2015/0083936 | A1* | 3/2015 | Wehrens | H05G 2/008 250/504 R |
| 2016/0143121 | A1 | 5/2016 | Lee et al. | |
| 2017/0358442 | A1* | 12/2017 | Hosoda | H05G 2/006 |
| 2018/0173102 | A1* | 6/2018 | Yabu | H05G 2/008 |
| 2018/0288863 | A1 | 10/2018 | Fujimaki et al. | |
| 2018/0314161 | A1 | 11/2018 | Suzuki | |
| 2018/0368242 | A1 | 12/2018 | Winkels et al. | |
| 2020/0344867 | A1 | 10/2020 | Lukens et al. | |

FOREIGN PATENT DOCUMENTS

| | | | |
|---|---|---|---|
| TW | 201127215 | A | 1/2011 |
| WO | 2017027566 | A1 | 2/2017 |
| WO | 2017102931 | A1 | 6/2017 |

OTHER PUBLICATIONS

Theo Driessen, "Drop Formation from Axi-symmetric Fluid Jets," Universiteit Twente, doi:10.3990/1.9789036535786 (Dec. 2013).

* cited by examiner

TARGET SUPPLY CONTROL APPARATUS AND METHOD IN AN EXTREME ULTRAVIOLET LIGHT SOURCE

CROSS-REFERENCE TO RELATED APPLICATIONS

This application claims priority to U.S. Application No. 62/810,673, which was filed on Feb. 26, 2019 and which is incorporated herein in its entirety by reference.

FIELD

The disclosed subject matter relates to an apparatus and method for tuning characteristics of targets delivered to a target space of a laser produced plasma extreme ultraviolet light source.

BACKGROUND

Extreme ultraviolet (EUV) light, for example, electromagnetic radiation having wavelengths of around 50 nm or less (also sometimes referred to as soft x-rays), and including light at a wavelength of about 13 nm, can be used in photolithography processes to produce extremely small features in substrates, for example, silicon wafers.

Methods to produce EUV light include, but are not necessarily limited to, converting a material that has an element, for example, xenon, lithium, or tin, with an emission line in the EUV range in a plasma state. In one such method, often termed laser produced plasma ("LPP"), the required plasma can be produced by irradiating a target material, for example, in the form of a droplet, plate, tape, stream, or cluster of material, with an amplified light beam that can be referred to as a drive laser. For this process, the plasma is typically produced in a sealed vessel, for example, a vacuum chamber, and monitored using various types of metrology equipment.

SUMMARY

In some general aspects, a target apparatus for an extreme ultraviolet (EUV) light source includes a target generator, a sensor module, and a target generator controller. The target generator includes a reservoir configured to contain target material that produces EUV light when in a plasma state and a nozzle structure in fluid communication with the reservoir. The target generator defines an opening in the nozzle structure, the opening being suitable to release the target material received from the reservoir. The sensor module is configured to: detect an aspect relating to target material released from the opening as the target material travels along a trajectory toward a target space, and produce a one-dimensional signal from the detected aspect. The target generator controller is in communication with the sensor module and the target generator. The target generator controller is configured to modify characteristics of the target material based on an analysis of the one-dimensional signal.

Implementations can include one or more of the following features. For example, the nozzle structure can include a capillary that defines the opening, and the opening can extend along a longitudinal direction of the capillary. The target generator controller can include an actuation apparatus configured to perturb a rate at which the target material is released through the opening. The actuation apparatus can include a piezoelectric inducer configured to apply pressure to target material in the form of fluid in the reservoir, and the target generator controller can be configured to change a signal supplied to the piezoelectric inducer to change the pressure applied to the fluid target material, which causes the rate at which the target material is released through the opening to be perturbed.

The target generator controller can include: a control system configured to generate a driving waveform based on the analysis of the one-dimensional signal, and an actuation apparatus in communication with the control system and interacting with the target material. The actuation apparatus can be configured to modify the characteristics of the target material in accordance with the driving waveform from the control system. The control system can be programmable and can be configured to generate a periodic driving waveform. The control system can be configured to modify aspects of the driving waveform including modifying one or more of one or more frequencies of the driving waveform and one or more phases of the driving waveform. The rate at which the driving waveform is modified can be about 100-500 different waveforms per second.

The sensor module can include one or more photodiodes, the output of each is a voltage signal related to current produced from the detected light; photo-transistors; light-dependent resistors; and photomultiplier tubes.

The target generator controller can be configured to not communicate with any detection modules configured to output a two-dimensional signal relating to the formed target.

The sensor module can be, independently from the communication with the target generator controller, in communication with an optical source controller that is configured to adjust one or more characteristics of radiation pulses directed toward the target space.

The target generator controller can have a sampling rate of at least 5 MHz.

The sensor module can be configured to detect light produced from an interaction between the target material and a light curtain directed to cross the trajectory. The sensor module can be configured to detect the aspect relating to the target material upon being triggered only by the interaction between the target material and the light curtain.

The sensor module can be configured to detect the aspect relating to the target material without relying on image processing and/or without relying on a trigger signal.

The target generator can be configured to release the target material according to a driving waveform supplied by the target generator controller. The target material travels along the trajectory, and at least some of the target material in the form of separate masses can coalesce to form the targets at the target space.

The target apparatus can also include a diagnostic system configured to diagnostically interact with target material traveling along the trajectory and before the target material enters the target space. The sensor module can be positioned to detect the aspect relating to the target material that relates to the diagnostic interaction between the target material and the diagnostic system. The diagnostic interaction can occur at a diagnostic distance away from the target space, the diagnostic distance being less than two times the spacing between adjacent targets formed from the target material traveling along the trajectory or halfway between the opening of the nozzle structure and the target space.

The target generator controller can be configured to set steady-state characteristics of the target generator after determining that the target material is within an acceptable range of properties at the target space based on the analysis of the one-dimensional signal. The target generator controller can also be in communication with a control apparatus of the EUV light source, and can be configured to notify the control apparatus once the steady state characteristics of the target generator are set.

In other general aspects, a target material traveling along a trajectory toward a target space in a chamber of an extreme ultraviolet (EUV) light source is controlled with a method. The method includes emitting target material through a longitudinal opening defined in a nozzle, the opening being fluidly coupled to a reservoir configured to contain the target material. The target material produces EUV light when in a plasma state. The method includes detecting an aspect relating to the target material as the target material travels along the trajectory toward the target space. The method includes producing a one-dimensional signal from the detected aspect; analyzing the one-dimensional signal; and modifying one or more characteristics of the emitted target material based on the analysis of the one-dimensional signal.

Implementations can include one or more of the following features. For example, target material can be emitted through the opening defined in the nozzle by releasing target material in the form of liquid through the opening. The target material being emitted through the opening can cause one or more particles of target material traveling toward the target space to coalesce into one or more targets before reaching the target space.

The one or more characteristics of the emitted target material can be modified by modifying parameters related to a velocity at which target material is released from the nozzle. The parameters related to the velocity at which the target material is released from the nozzle can be modified by modifying a driving waveform supplied to an actuation apparatus in fluid communication with the target material in the reservoir. The driving waveform supplied to the actuation apparatus in fluid communication with the target material in the reservoir can be modified by producing or perturbing pressure waves in the target material in the reservoir.

The one or more characteristics of the emitted target material can be modified by modifying the one or more characteristics at a rate of 100-500 Hz.

The aspect relating to the target material can be detected by detecting light produced from an interaction between the target material and a diagnostic probe. The aspect relating to the target material can be detected by detecting the light upon being triggered only by the interaction between the target material and the diagnostic probe. The one-dimensional signal can be produced from the detected light by producing a voltage signal from current produced from the detected light.

The one-dimensional signal can be analyzed by determining one or more moving properties of the target material.

The one or more characteristics of the emitted target material can be modified by modifying the one or more characteristics independently of any analysis relating to a two-dimensional signal relating to the target material.

The aspect relating to the target material can be detected independently of image processing. The aspect relating to the target material can be detected independently from a trigger signal related to radiation pulses directed toward the target space.

The method can also include determining whether one or more characteristics of the target material are within an acceptable range at the target space based on the analysis of the one-dimensional signal and notifying a control apparatus of the EUV light source when it is determined that the one or more characteristics of the target material are within the acceptable range at the target space. The method can also include maintaining the one or more characteristics of the target material within the acceptable range. Determining whether the one or more characteristics of the target material are within an acceptable range at the target space can include determining that the target material coalesces into targets having acceptable shapes prior to entering the target space.

In other general aspects, a target apparatus for an extreme ultraviolet (EUV) light source is tuned according to a method. The method includes operating the target apparatus including a nozzle in fluid communication with a reservoir in tuning mode. The tuning mode of operation includes releasing target material from the nozzle along a trajectory toward the target space, wherein the target material produces EUV light when in a plasma state. The tuning mode of operation includes adjusting a state of the target material that is released from the nozzle including adjusting one or more characteristics of the target material. The one or more characteristics of the target material that are adjusted include one or more of a location and a time at which target material coalesces into targets along the trajectory prior to entering the target space. The tuning mode of operation includes detecting one or more aspects related to the target material as the target material travels along the trajectory toward the target space. The one or more aspects are detecting at a plurality of different adjustment states. The method includes, based on the detected one or more aspects, determining a set of steady-state performance characteristics associated with the target material. The method includes, after determining the set of steady-state performance characteristics associated with the target material, then operating the target apparatus in steady-state mode based on the set of steady-state performance characteristics, and notifying a control apparatus of the EUV light source that the target apparatus is operating in steady-state mode.

Implementations can include one or more of the following features. For example, one or more aspects related to the target material as the target material travels along the trajectory toward the target space can be detected by detecting one or more aspects related to the target material before the target material coalesces into targets.

The one or more aspects related to the target material as the target material travels along the trajectory toward the target space can be detected by detecting one or more aspects related to targets that are formed from coalesced target material.

The one or more characteristics of the target material that is released from the nozzle can be adjusted by adjusting the one or more characteristics at a rate of about 100-500 Hz.

DETAILED DESCRIPTION

Figure 1B:
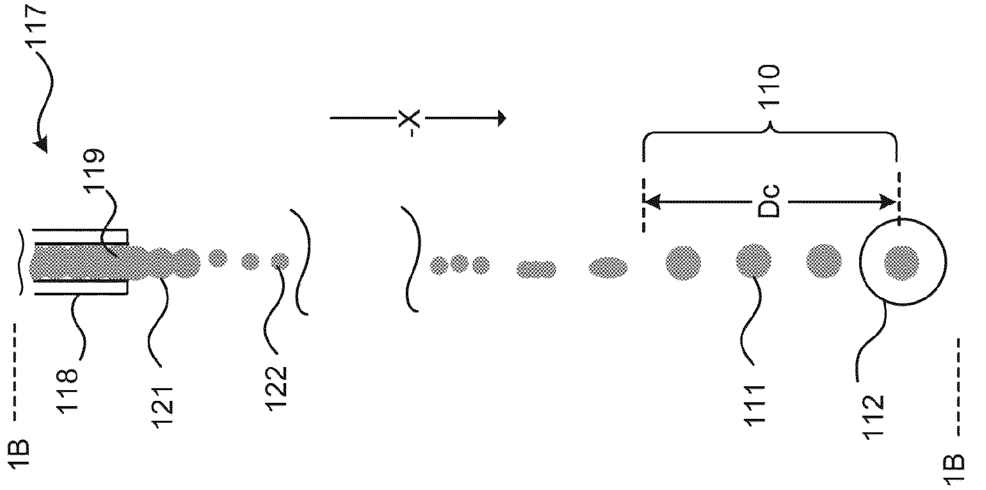
FIG. 1B is a schematic illustration of an example of a jet formed from the target generator that breaks up into sub-targets traveling toward the target space and coalesced targets traveling toward the target space.
Figure 1A:
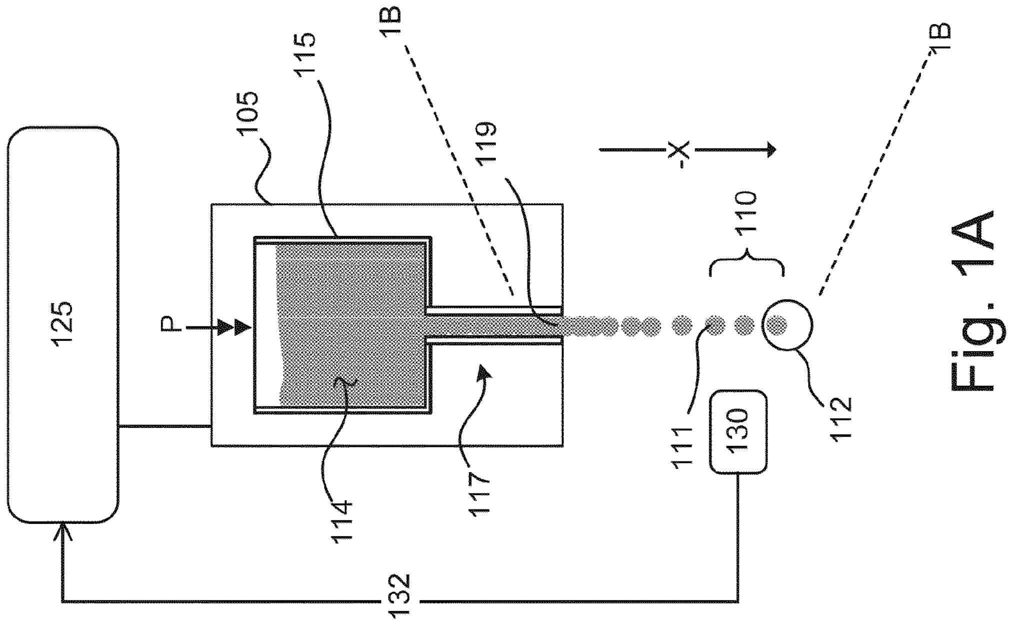
FIG. 1A is a block diagram of a target apparatus including a target generator that is configured to form a stream of targets directed to a target space of an extreme ultraviolet (EUV) light source.

Referring to FIG. 1A, a target apparatus 100 includes a target generator 105 that is configured to form a stream 110 of targets 111 directed to a target space 112 of an extreme ultraviolet (EUV) light source. The targets 111 are formed from target material 114 that produces EUV light when in a plasma state. The target space 112 is, for example, a location at which the targets 111 are converted to the plasma state.

The target generator 105 includes a reservoir 115 defining a hollow interior that is configured to contain the target material 114. The target generator 105 includes a nozzle structure 117 having an opening (or orifice) 119 in fluid communication with the interior of the reservoir 115. The interior of the reservoir 115 can be maintained at a pressure P that is greater than the pressure outside the opening 119. The target material 114, in a fluid state, being under the force of the pressure P (as well as other possible forces such as gravity), flows from the interior of the reservoir 115 and through the opening 119 to form the stream 110. The trajectory of the target material 114 and the targets 111 that are formed from the target material 114 generally extends along the −X direction, although it is possible for the trajectory of the target material 114 and the targets 111 to include components along the plane perpendicular to the −X direction (that is, Y and Z components).

The target material 114 can exit the opening 119 as a jet of target material or as a stream of sub-targets. During steady-state operation of the EUV light source, it is desired that the target material 114 be in the form of defined targets 111 of a particular size and geometry when reaching the target space 112. For example, as shown in FIG. 1B, a jet 121 of target material 114 is released from the opening 119, and the jet 121 eventually breaks up into sub-targets 122 traveling toward the target space 112. The phenomenon that leads the jet 121 to break up into sub-targets 122 is referred to as Rayleigh Plateau instability. At a location that is a distance Dc along the trajectory and before reaching the target space 112, these sub-targets 122 coalesce (combine together) to form the larger defined targets 111 of a particular size and geometry or shape that reach the target space 112.

The characteristics of the target material, including the location Dc at which the sub-targets 122 coalesce to form the targets 111, the stability of the formed targets 111, and the size and geometry of the formed targets 111, can be controlled by controlling aspects relating to the pressure P that is applied to the target material 114. The location Dc at which the sub-targets 122 coalesce to form the targets 111, the stability of the formed targets 111, and the size and geometry of the formed targets 111 can be adjusted or controlled during a tuning mode of operation of the target apparatus 100, such tuning mode occurs prior to steady-state mode of operation of the EUV light source. After tuning mode is completed, the target apparatus 100 can inform the EUV light source and begin operating under steady-state operation (if suitable). Such adjustment and control ensure that the targets 111 are formed and stabilized before the target material 114 reaches the target space 112 and that such formed targets 111 have a desired size and geometry for efficient EUV light production. It is also possible for the target apparatus 100 to continue adjusting and controlling characteristics of the target material 114 even during steady-state operation.

As an example, the jet 121 of target material eventually breaks up into sub-targets 122 and this can occur naturally (as discussed above, this is the Rayleigh Plateau instability). The natural breakup of the jet 121 issuing from the opening 119 produces sub-targets 122 at a particular rate of production, and this rate of production is related, at least in part, to an average (or mean) velocity of the target material 114 through the opening 119 and also to a transverse extent (such as a diameter) of the opening 119. This natural breakup of the jet 121 can occur without modulating the pressure P of the target material 114 because the jet 121 is inherently unstable and this instability begins with the existence of several tiny perturbations (noise spectrum) in the jet 121. These tiny perturbations are always present at least in part due to, for example, friction between the nozzle structure 117 and the target material 114 and thermal gradients in the jet 121. The noise spectrum is broadband, and it includes many different frequency components. In some circumstances, with the geometry of the nozzle structure 117 and the target material 114 being made of tin, a typical natural breakup frequency can be about 3 megahertz (MHz). The target apparatus 100 is configured to modulate or adjust the pressure P according to various parameters of a driving waveform (such as driving waveform 326 discussed below with reference to FIG. 3) to thereby permit more control over the breakup of the jet 121 from the nozzle structure 117. By modulating or adjusting the pressure P at an amplitude that is greater than the size of the perturbations in the noise spectrum (at which break up occurs naturally), the exit velocity of the target material 114 at the opening 119 is modulated, and allows the break up parameters of the jet 121 to be controlled. For example, the amplitude of the controlled modulation to the pressure P can be at least an order of magnitude greater than the size of the perturbations in the noise spectrum.

To achieve adjustment and control of the characteristics of the target material 114 released from the opening 119, and to ensure that all sub-targets 122 coalesce into targets 111 before reaching the target space 112, the target apparatus 100 includes a target generator controller 125, which generates different driving waveforms to change how the target material 114 is emitted from the opening 119 and also to change how the target material 114 behaves as it travels along the trajectory, and a sensor module 130, which senses or detects the actual response in the behavior of the target material 114 to the different driving waveforms generated by the target generator controller 125.

The sensor module 130 is positioned relative to the stream 110. The sensor module 130 is configured to detect one or more aspects relating to the target material 114 that has been released from the opening 119 as the target material 114 travels along a trajectory toward the target space 112. Thus, depending on when and where the target material 114 breaks up (due to the Rayleigh Plateau instability) and subsequently coalesces along the trajectory, the sensor module 130 can be configured to detect aspects relating to one or more of the jet 121, the sub-targets 122, and the targets 111.

The target generator controller 125 is in communication with the target generator 105 and also the sensor module 130. During the tuning mode of operation (in which the EUV light source is in standby mode, and not operating to produce EUV light), the target generator controller 125 modifies parameters associated with how the target generator 105 operates to thereby probe the characteristics (such as the location Dc at which the sub-targets 122 coalesce to form the targets 111, the stability of the formed targets 111, and the size and geometry of the formed targets 111) of the target material 114 released from the opening 119. During this probing (in which the parameters associated with the target generator 105 are modified to thereby modify the characteristics of the target material), the target generator controller 125 analyzes how the characteristics of the target material 114 change. The target generator 125 analyzes an output signal 132 from the sensor module 130 that is set up to detect the aspects of the target material 114 that are being modified during the probing. The target generator controller 125 adjusts (tunes) characteristics of the target material 114 and/or the targets 111 delivered to the target space 112 based on an analysis of this output signal 132.

The output signal 132 from the sensor module 130 can be sampled or received at the target generator controller 125 at a rate (referred to as the sampling rate) of at least 5 MHz (or at least 20 MHz). Moreover, the target generator controller 125 can measure the system response (that is, how the target material 114 behaves as it travels along the trajectory) to between a plurality of (for example, 100-500) different driving waveforms per second (100-500 Hz), with 50 periods of the target material 114 (which can be the target 111 or pre-coalesced sub-targets 122) traced per setting. In this example, 50×100 Hz=5000 Hz, which is about 1000 times more information that can be obtained from a traditional detector that outputs a two-dimensional signal. A more advanced detector that outputs a two-dimensional signal at a much higher frame rate, such as a camera that outputs at a higher frame rate than 5 Hz, can have a more limited region of interest. Because the target material 114 and the sub-targets 122 tend to be more spread out over a larger area (for example, on the order of mm) than the targets 111 are, a more limited region of interest in such a two-dimensional sensor means that the smaller formations of the target material 114 (such as the sub-targets 122) can go undetected.

Moreover, the target generator controller 125 can determine a set of performance characteristics (referred to as "best-mode performance characteristics") associated with the target generator 105 that produce optimum or improved characteristics of targets 111 delivered to the target space 112. For example, the best-mode performance characteristics associated with the target generator 105 can include those characteristics that reduce (or eliminate) the number of sub-targets 122 that fail to coalesce into targets 111 before reaching the target space 112. Once the best-mode performance characteristics are determined, the target generator controller 125 can lock those best-mode performance characteristics in place and operate the target generator 105 so as to maintain such best-mode performance characteristics, at least until instructed otherwise, or until other factors causes changes in the optimum or improved characteristics. These best mode performance characteristics can be used during steady-state operation.

The target generator controller 125 can rapidly perform this tuning, thus ensuring that downtime for the EUV light source during tuning is as brief as possible. The target generator controller 125 is able to perform rapid tuning because it relies on the output signal 132 from the sensor module 130, such output signal 132 being a one-dimensional signal, and because the output signal 132 from the sensor module 130 is connected directly to the target generator controller 125. A one-dimensional signal is a signal that contains information in only a single dimension or direction. Thus, a signal of a voltage versus time or current versus time contains information of an amplitude (voltage or current) as it changes over time. By contrast, a two-dimensional signal contains information in two dimensions. For example, an image is a two-dimensional signal because it contains information along two coordinates of a sensor in a plane.

Thus, the control loop is short and direct. In various implementations, the target generator controller 125 does not share the output signal 132 with other control systems of the EUV light source. Additionally, the amount of signal processing required by the target generator controller 125 is reduced because a one-dimensional signal (which is easier to analyze than a multi-dimensional signal or data such as two-dimensional image data or video data) is the primary or only information analyzed in the control loop. For example, the sensor module 130 detects a one-dimensional aspect or characteristic of the target material released from the opening 119.

As an example, the sensor module 130 can detect an intensity of light that has interacted with the target material.

In some implementations, the sensor module 130 includes one or more photodiodes, the output of each is a voltage signal related to current produced from detected light. In other implementations, the sensor module 130 can include one or more photo-transistors, light-dependent resistors, or photomultiplier tubes, each of which is configured to output a one-dimensional signal 132 for analysis. The sensor module 130 is configured with a sampling rate that enables detection of the aspects of the target material 114 for every instance of the target material 114 that travels along the trajectory toward the target space 112. Moreover, the sensor module 130 is configured to detect sizes of the instances of the target material 114 that are as small as 5 μm; this means that even a particle (such as the sub-targets 122) having a size of 5 μm will show up in the signal detected at the sensor module 130.

Moreover, in various implementations, the target generator controller 125 performs such rapid tuning without relying on image processing (or any processing that relies on a two-dimensional signal) and also without relying on an external trigger signal. An external trigger signal is a signal other than the output signal 132 that is analyzed by the target generator controller 125. Thus, the target generator controller 125 triggers the analysis based only on the information in the output signal 132.

In general, the targets 111 that reach the target space 112 can be approximately spherical, with a diameter of about 15-40 μm, or about 27 μm. Moreover, the velocity of the targets 111 that approach the target space 112 can be between 40-180 meters (m) per second (m/s) or up to 500 m/s. The spatial separation between the targets 111 that approach the target space 112 can be between about 1 mm and 3 mm, and in some implementations about 1.4 mm. The rate at which targets 111 approach the target space 112 can be on the order of tens of kilohertz (kHz), for example, between 20-240 kHz, or 20-160 kHz, or 20-70 kHz. A single target 111 that reaches the target space 112 can be made up of a plurality of sub-targets 122. For example, tens or hundreds of sub-targets 122 can coalesce to form a single target 111 that reaches the target space 112. Depending on the rate at which the targets 111 approach the target space 112, on the size of the targets 111, and the pressure P applied to the target material 114, a single target 111 that reaches the target space 112 can be made up of about 50-300 smaller-sized sub-targets 122. For example, in order to obtain a successful coalescence of the sub-targets 122 into targets 111 a rate of about 50 kHz (at the target space 112), where each target 111 has a diameter of about 30 μm, with an applied pressure P of about 28 megapascals (MPa), each target 111 is formed from about 100 coalesced sub-targets 122.

In some implementations, as shown in FIG. 1B, the nozzle structure 117 includes a capillary tube 118 that extends generally along a longitudinal direction (that is parallel with the X direction) and defines the opening 119. The opening 119 is at an end of the capillary tube 118. The capillary tube 118 can be made from, for example, glass in the form of fused silica, borosilicate, aluminosilicate, or quartz. The target material 114 in the reservoir 115 is in a form that is able to flow. For example, in implementations in which the target material 114 includes a metal (such as tin) that is solid at room temperature, the metal is heated to a temperature at or above the melting point of the metal and is maintained at that temperature such that the target material is in liquid form. The target material 114 flows through the capillary tube 118 and is ejected through the opening 119. The Laplace pressure is the difference in pressure between the inside and the outside of a curved surface that forms the boundary between a gas region and a liquid region. The pressure difference is caused by the surface tension of the interface between the liquid and the gas. When the pressure P is greater than the Laplace pressure, the target material 114 exits the opening 119 as the continuous jet 121.

Figure 2:
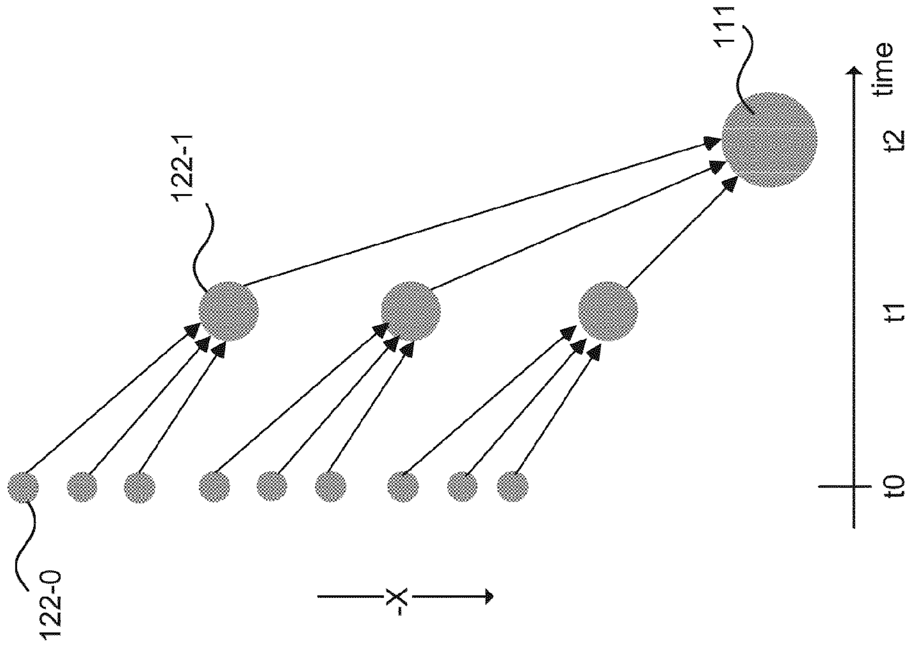
FIG. 2 is a schematic illustration showing coalescence stages of sub-targets that travel toward the target space from the target generator of FIG. 1A.

As an example, and with reference to FIG. 2, smaller-sized sub-targets 122-0 can be formed from the jet 121 due to the Rayleigh Plateau instability. In this example, nine smaller-sized sub-targets 122-0 are shown at time t0 dispersed along the trajectory and traveling generally along the −X direction toward the target space 112. At a point in time t1 that is later than time t0, groups of three smaller-sized sub-targets 122-0 have coalesced into three intermediate sub-targets 122-1, and such coalescence occurs while the smaller-sized sub-targets 122-0 are moving along the trajectory (and thus the intermediate sub-targets 122-1 are farther along the −X direction than their respective smaller-sized sub-targets 122-0). At a point in time t2 that is later than time t1, these three intermediate sub-targets 122-1 have coalesced into a single target 111. It is possible for many more smaller-sized sub-targets 122-0 to coalesce into intermediate sub-targets 122-1 than just three. Moreover, it is possible for the smaller-sized sub-targets 122-0 to coalesce in a single event (instead of forming intermediate sub-target 122-1) to form the targets 111. The sensor module 130 is arranged relative to the trajectory so that it can sense or detect aspects relating to the target material 114 as it travels along the trajectory toward the target spaced 114, and therefore the sensor module 130 can detect aspects relating to any stage of coalescence of sub-targets (including the stage before coalescence) or to the targets 111.

Figure 3:
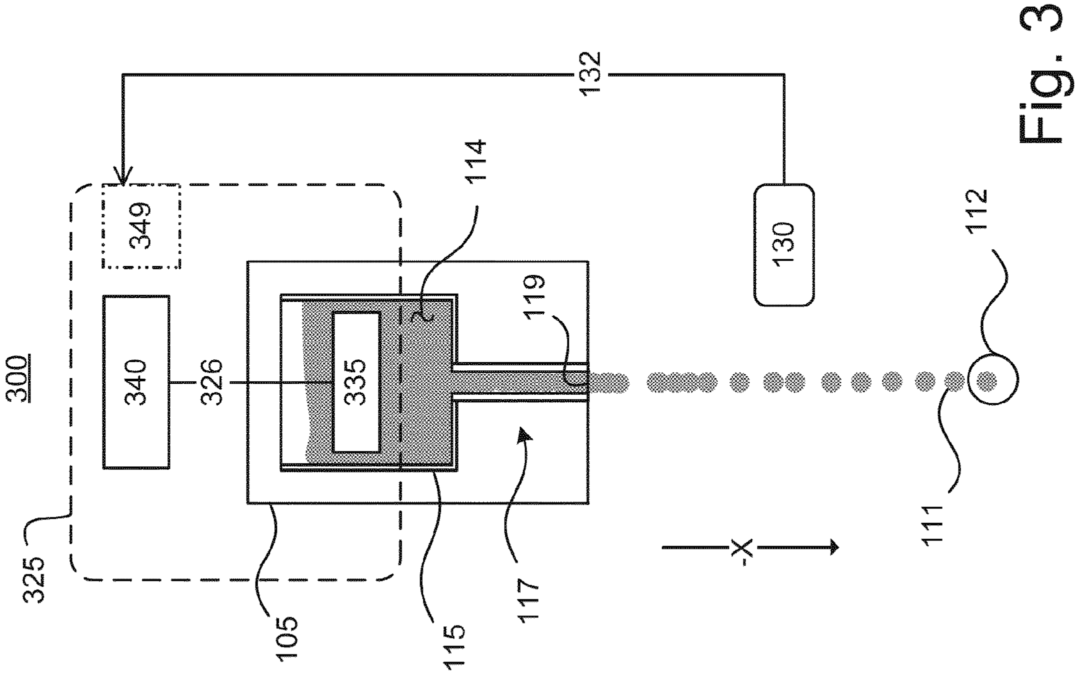
FIG. 3 is a block diagram of an implementation of the target apparatus of FIG. 1A.

Referring to FIG. 3, in an implementation, a target apparatus 300 includes a target generator controller 325. In this implementation, the target generator controller 325 includes an actuation apparatus 335 configured to perturb a rate at which the target material 114 is released through the opening 119. The target generator controller 325 includes a control system 340 in communication with the actuation apparatus 335. The control system 340 is configured to provide a driving signal (for example, the driving waveform 326) to the actuation apparatus 335 to control how the pressure P is applied to the fluid target material 114. A signal capture device 349 records the one-dimensional output signal 132 from the sensor module 130. The signal capture device 349 prepares the output signal 132 for use by the control system 340. The signal capture device 349 can include an oscilloscope or an analog to digital converter that captures the one-dimensional output signal 132 from the sensor module 130 and prepares it for use by the control system 340. In other implementations, the signal capture device 349 can be integrated with the sensor module 130 so that the output signal 132 from the sensor module 130 is already prepared for use by the control system 340.

The driving signal 326 provided to the actuation apparatus 335 is the driving waveform 326, which is periodic in time. The control system 340 is programmable, which means that the control system 340 is configured to be provided with coded instructions for the automatic performance of the task to generate the driving waveform 326 for the actuation apparatus 335.

The target generator controller 325 can also include other processing components, which can be separate components or integrated within the control system 340.

The control system 340 can also change one or more properties of the driving waveform 326 provided to the actuation apparatus 335 to perturb or modulate the pressure P applied to the target material 114, which modulates or changes the rate at which the target material 114 is released through the opening 119. In this way, the actuation apparatus 335 is configured to modify the characteristics of the target material 114 output from the opening 119 in accordance with the driving waveform 326 from the control system 340.

Figure 4:
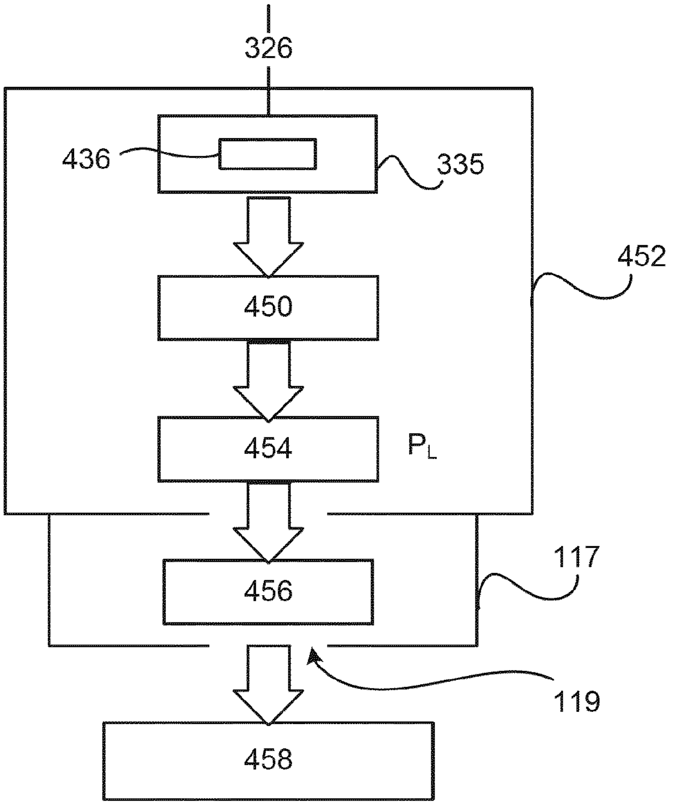
FIG. 4 is a block diagram illustrating an implementation of operation of an actuation apparatus of the target apparatus of FIG. 1A or 3.

Referring to FIG. 4, a block diagram shows how the actuation apparatus 335 affects changes to the target material 114 that is released through the opening 119. The actuation apparatus 335 of the target generator controller 325 causes a displacement 450 in a volume 452 of the target material 114 in accordance with the driving waveform 326 from the control system 340. The volume 452 in which displacement occurs can be within the reservoir 115 or the nozzle structure 117. This displacement 450 of the volume 452 happens in response to physical motion of the actuation apparatus 335 because the target material 114 in the fluid state (such as liquid) is non-compressible. The physical motion of the actuation apparatus 335 can be periodic (in accordance with the periodic driving waveform 326) and thus the displacement 450 can also be periodic. The displacement 450 in the volume 452 causes a pressure wave 454 in the volume 452. The pressure wave 454 is a wave in which the propagated disturbance (the periodic displacement 450) is a variation of localized pressure $P_L$ in the target material 114. The pressure wave 454 in the target material 114 of the volume 452 causes a perturbation 456 in a velocity of the fluid jet 121 exiting the opening 119 of the nozzle structure 117. The fluid jet 121 breaks up into the sub-targets 122 having different velocities, and these velocity differences induce eventual coalescence 458 into the targets 111.

For example, the driving waveform 326 provided to the actuation apparatus 335 is a voltage signal that includes a plurality of components at different frequencies, and this voltage signal is applied to an actuator 436 within the actuation apparatus 335. In response to the application of the voltage signal, the actuator 436 within the actuation apparatus 335 vibrates at the plurality of different frequencies.

As a basic example, the driving waveform 326 can include at least a first frequency component associated with a first frequency and a second frequency component associated with a second frequency. The first frequency is a lower frequency than the second frequency. Vibrating the actuator 436 at the second frequency causes the fluid jet 121 to break up into relatively small targets (sub-targets 122) of desired sizes and speeds. The first frequency is used to modulate the velocity of the sub-targets 122 in the stream and to encourage coalescence among the sub-targets 122 such that the larger targets 111, each formed from a plurality of the relatively smaller sub-targets 122, are formed. Thus, the rate or frequency at which the targets 111 reach the target space 112 corresponds to the first frequency of the driving waveform 326. In any given group of sub-targets 122, the various sub-targets 122 travel at different velocities (see FIG. 2). The sub-targets 122 with higher velocities can coalesce with the sub-targets 122 with lower velocities to form larger coalesced targets 111 that make up the stream 110. These larger targets 111 are separated from each other by a larger distance than the non-coalesced sub-targets 122. After coalescence, the targets 111 in the stream 110 are approximately spherical and have a size that is on the order of 10-40 μm.

The second frequency can be on the order of megahertz (MHz). For example, the second frequency can be close to the Rayleigh frequency, which is the frequency that leads to the Rayleigh Plateau instability and causes the jet 121 to break up into the sub-targets 122. The first frequency (which is lower) can be on the order of kilohertz (kHz) (for example, 20-70 kHz or 50 kHz). The first frequency can be used to modulate the velocity of the sub-targets 122 along the trajectory and also to determine the rate of production of the sub-targets 122. Modulating the pressure in the volume 452 at a frequency that is much lower than the Rayleigh frequency causes groupings of sub-targets 122 to form, with each grouping including sub-targets 122 of different velocities, thus causing coalescence.

More than two frequencies can be used in the driving waveform 326. Introducing additional spectral components of the modulation signal allows a better controlled and more efficient coalescence process. Usually these additional frequencies are the higher order harmonics of the desired frequency of the targets 111 and are selected in the range between the first frequency (a frequency in the kHz range) and the second frequency (a frequency in the MHz range). For example, the driving waveform 326 can be composed of several deliberately selected sine waves aligned in phase and amplitude, or a periodic waveform that contains high frequency harmonics of the desired target frequency ("first frequency"), such as, for example, a pulse wave, a sawtooth wave, or a sine wave.

Figure 11A:
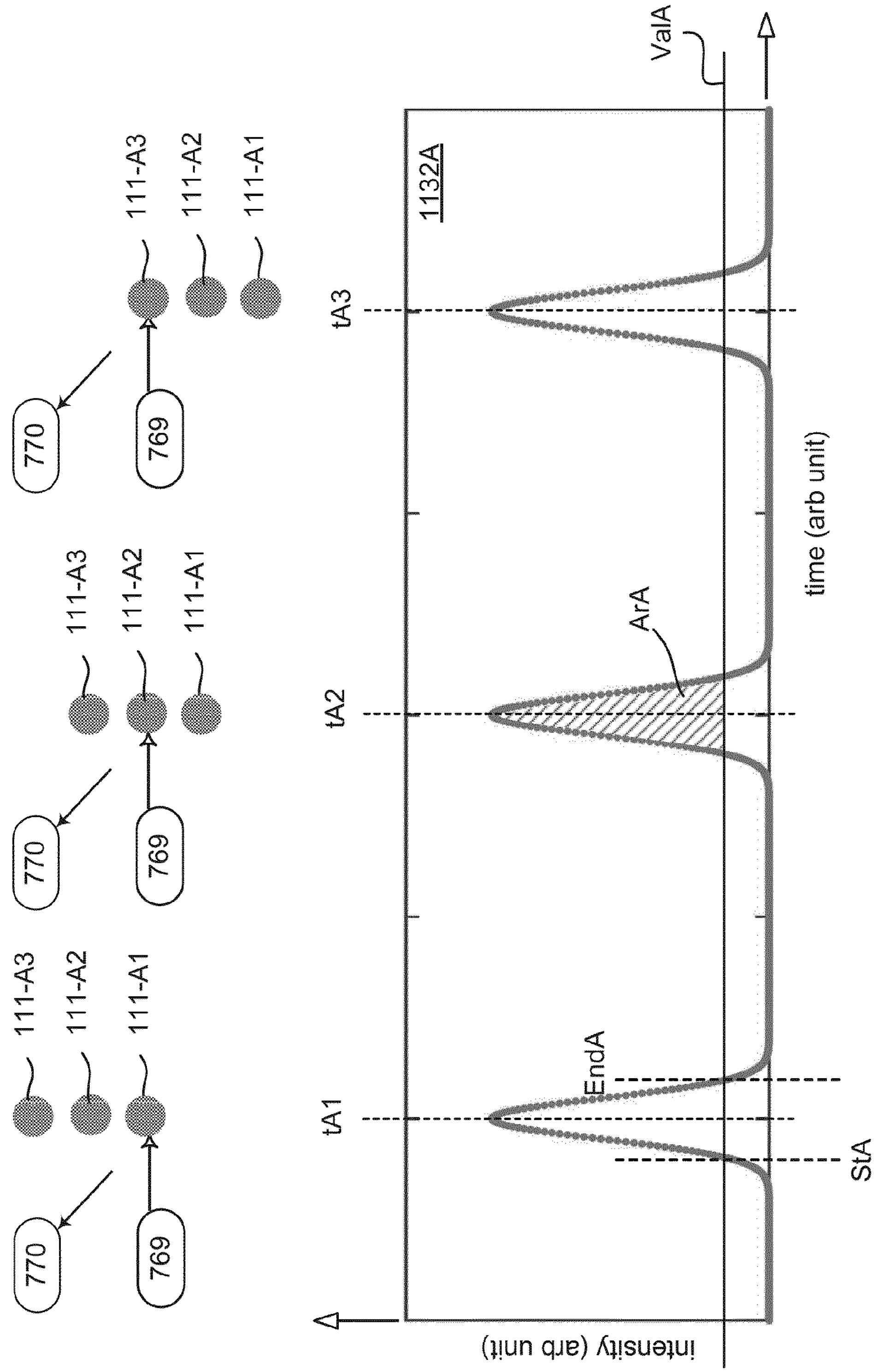
FIG. 11A is an example of a graph of an output signal that is produced from a sensor module of the target apparatus of FIG. 1A, 3, or 7 including an illustration of the diagnostic interaction with the target material that produces the output signal.
Figure 11B:
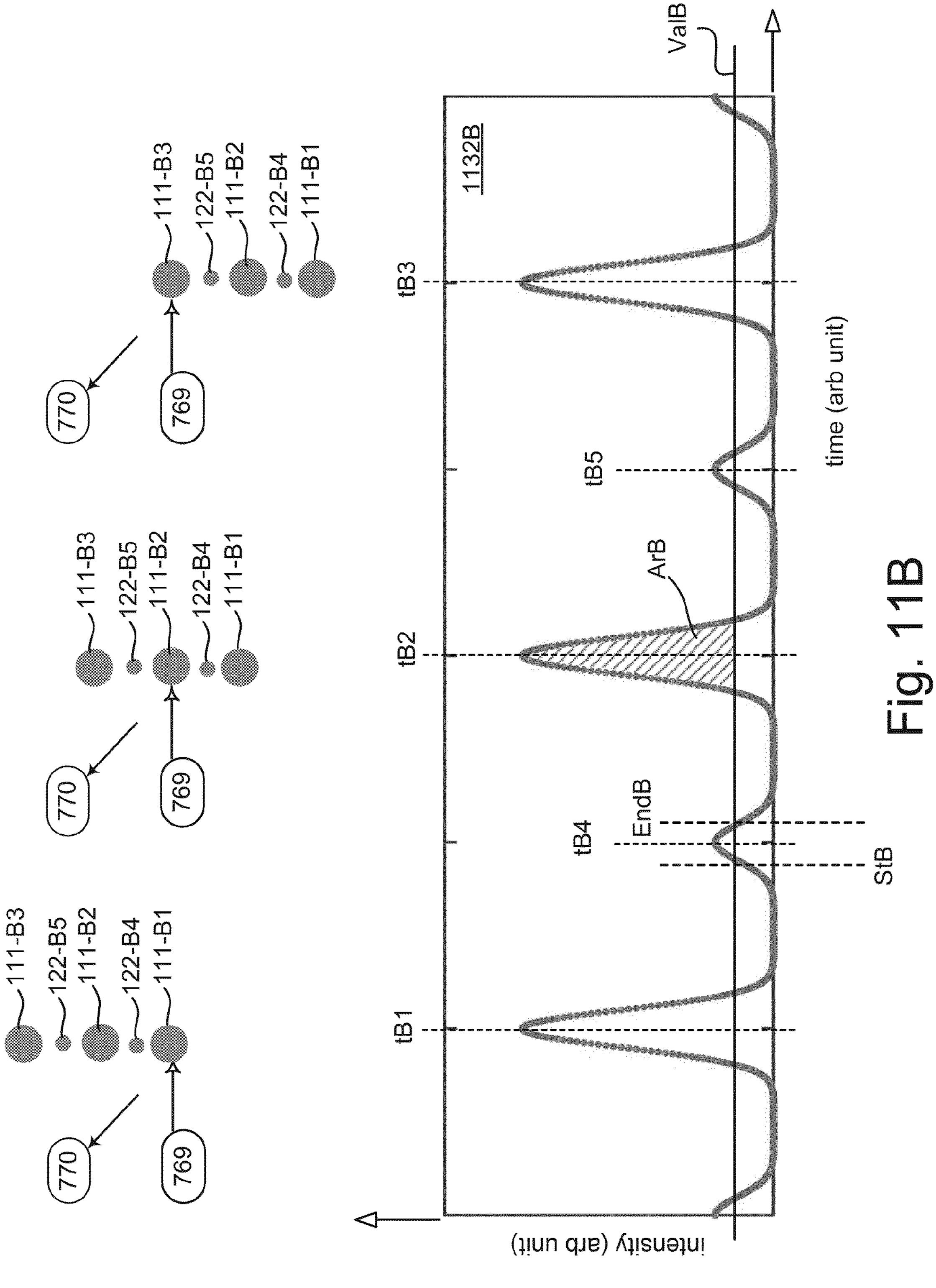
FIG. 11B is an example of a graph of an output signal that is produced from a sensor module of the target apparatus of FIG. 1A, 3, or 7 including an illustration of the diagnostic interaction with the target material including sub-targets that produces the output signal.

The target material 114 (including the sub-targets 122 and the targets 111) are controlled by the periodic driving waveform 326, and thus the time stamps that are output from the sensor module 130 fit the driving waveform 326. The output signal 132 from the sensor module 130 includes peaks in amplitude that correspond to separate instances of the target material 114 (moments in time at which an aspect associated with the target material 114 is detected at the sensor module 130), as shown, for example, in FIGS. 11A-11C. The during of each peak in the output signal 132 is determined based on properties related to the aspect that is detected by the sensor module 130. Thus, if the sensor module 130 detects diagnostic light (such as diagnostic light 770) from an interaction between one or more diagnostic probes 769 and the target material 114, then each peak in the output signal 132 corresponds to such interaction and the duration of the peak is determined by how long the target material 114 interacts with the diagnostic probe 769. In some implementations in which the target probe 769 is a light beam having an extent along the X axis, the duration can correspond to about 1 μs. In order to have enough resolution in the output signal 132 to enable accurate detection of the target material 114, the sample rate of the sensor module 13 can be on the order of several MHz, for example, greater than or equal to about 1 MHz, greater than or equal to about 10 MHz, or greater than or equal to about 20 MHz.

Figure 5:
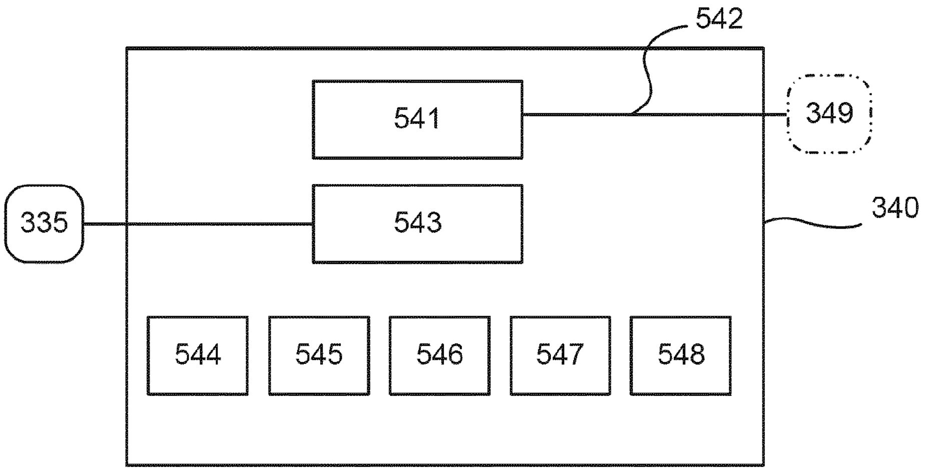
FIG. 5 is a block diagram of an implementation of a control system of the target apparatus of FIG. 3.

Referring to FIG. 5, in some implementations, the control system 340 includes a signal processing module 541 that is configured to receive an output signal 542 from the signal capture device 349, where the output signal 542 is a voltage signal related to a current produced from the detected light at a light detector of the sensor module 130. Generally, the signal processing module 541 analyzes the output signal 542 from the signal capture device 349. For example, the signal processing module 541 can analyze a set of time stamps corresponding to how the target material 114 interacts with a diagnostic light beam as it travels along the trajectory toward the target space 112, can determine whether an amplitude of the output signal 542 is greater than a threshold value, can determine a size (such as an area) of the output signal 542 that is greater than the threshold value, and/or can look at the start and end times at which the output signal 542 crosses the threshold value, as discussed below with reference to FIGS. 11A and 11B.

The signal processing module 541 can determine whether the output signal 542 is stable and whether and when coalescence occurs and can determine how the target material 114 is behaving as it travels along the trajectory. The signal processing module 541 also knows which driving waveform 326 supplied to the actuation apparatus 335 resulted in the output signal 542 currently being analyzed. Because of this, the signal processing module 541 can make a determination about how to modify the driving waveform 326 supplied to the actuation apparatus 335 to improve the characteristics of the target material 114. For example, the signal processing module 541 can determine how to modify one or more phases and amplitudes of the driving waveform 326.

The control system 340 also includes an actuation module 543 in communication with the actuation apparatus 335. If the signal processing module 541 determines that adjustments to the driving waveform 326 are needed (based on the analysis), then it sends an appropriate signal to the actuation module 543. The actuation module 543 can be within the control system 340 (as shown in FIG. 5) or it can be integrated within the actuation apparatus 335.

The control system 340 can also include or have access to one or more programmable processors 544, and one or more computer program products 545 tangibly embodied in a machine-readable storage device for execution by a programmable processor. The one or more programmable processors can each execute a program of instructions to perform desired functions by operating on input data and generating appropriate output. Generally, the processor receives instructions and data from memory 546. The memory 546 can be read-only memory and/or random-access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed ASICs (application-specific integrated circuits).

The modules within the control system 340 (such as the signal processing module 541 and the actuation module 543) can each include their own digital electronic circuitry, computer hardware, firmware, and software as well as dedicated memory, input and output devices, programmable processors, and computer program products. Likewise, any one or more of the modules 541, 543 can access and use the memory 546, one or more input devices 547 (such as a keyboard, touch screen, microphone, mouse, hand-held input device, etc.), one or more output devices 548 (such as speakers and monitors), one or more programmable processors 544, and one or more computer program products 545.

Although the control system 340 is shown as a separate and complete unit, it is possible for each of its components and modules to be separate units. Moreover, the target generator controller 325 (or the control system 340) can include other components, such as dedicated memory, input/output devices, processors, and computer program products, not shown in FIGS. 3 and 5. For example, the target generator controller 325 can also interface with the EUV light source. As mentioned above, after the tuning mode is completed, the target apparatus 100 (by way of the target generator controller 325) can inform the EUV light source and begin operating under steady-state operation (if suitable).

Figure 6A:
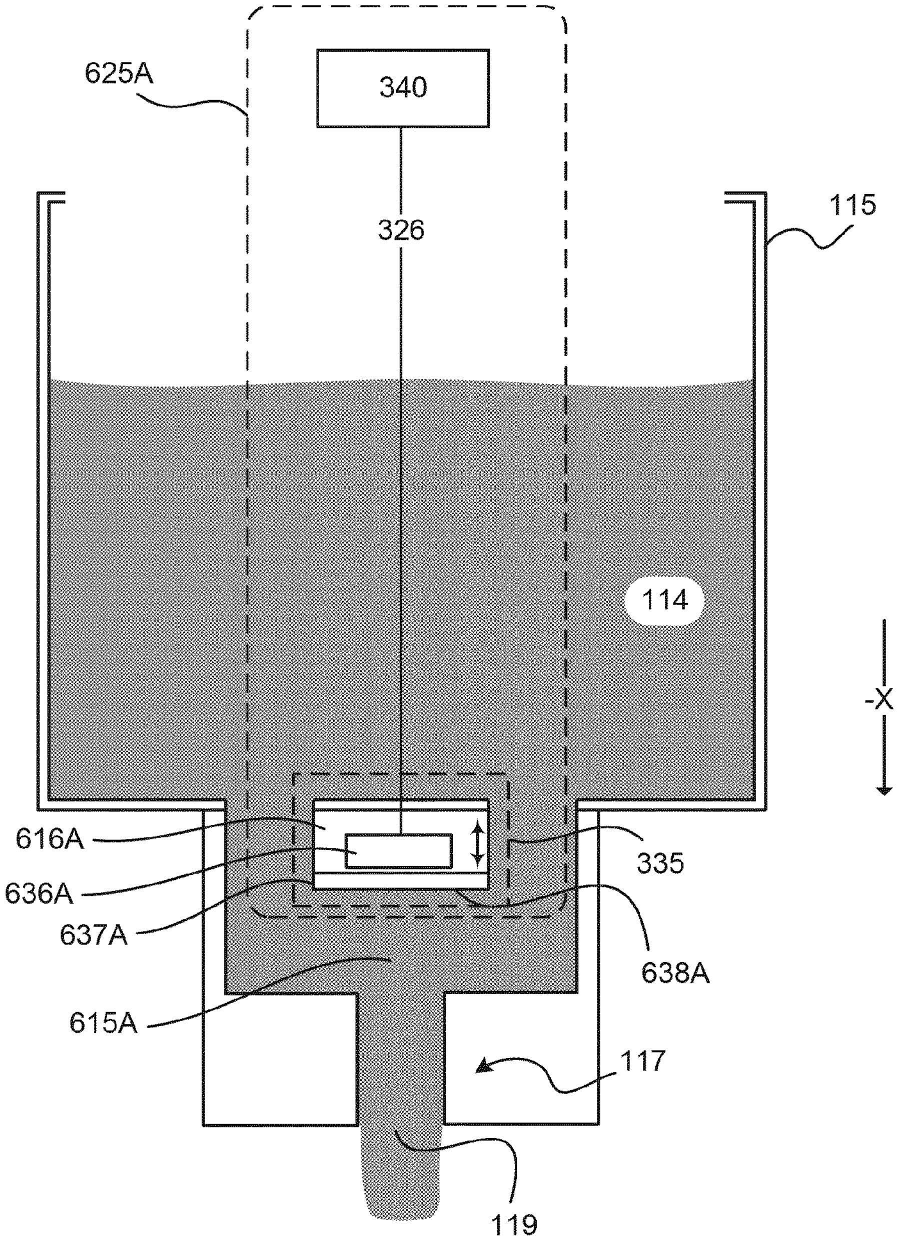
FIG. 6A is a schematic illustration of an implementation of an actuation apparatus of the target apparatus of FIG. 3.

The actuation apparatus 335 can include any suitable actuation mechanism that is able to modulate or perturb the pressure P of the target material 114 in the reservoir 115. In some implementations of the target generator controller 625A, as shown in FIG. 6A, the actuation apparatus 335 is an actuation apparatus that includes an actuator 636A in a cavity or space 616A and mechanically coupled to the target material 114 through a membrane 637A. The membrane 637A is mechanically coupled to the actuator 636A and also to a wall 638A. The wall 638A partly defines the cavity 616A on one side and partly defines a secondary fluid chamber 615A that fluidly coupled to the target material 114 in the reservoir 115. The secondary fluid chamber 615A is fluidly coupled to the opening 119 of the nozzle structure 117. Any changes in the position of the membrane 637A produce corresponding changes in the pressure P applied to the target material 114 in the secondary fluid chamber 615A, and this produces the changes in the pressure applied to the target material 114 that flows through the nozzle structure 117 and out of the opening 119. The actuator 636A can be fixed (such as by clamping, gluing, soldering, or brazing) to a wall of the reservoir 115 or a side wall that partly defines the cavity 616A. The actuator 636A can be configured to expand or contract along the X axis to cause the membrane 637A to move along the X axis. The actuator 636A can be any suitable mechanism that is able to change the position of the membrane 637A. For example, the actuator 636A can be a piezo actuator, which includes a piezo material that exhibits an inverse piezoelectric effect such that the piezo material elongates, bends, contracts, expands, and/or otherwise changes shape when an electric field is applied (from the control system 340). In implementations in which the actuator 636A is a piezo actuator, the actuator 636A can include a piezoelectric ceramic material such as lead zirconate titanate (PZT) or another similar material. In some implementations, the actuator 636A can be a single piezo actuator (for example, a single piezo-platelet or a single layer of material that exhibits the inverse piezo effect), two piezo actuators, or a multi-layer piezo assembly. In some implementations, the actuator 636A is formed from a single layer of piezo material deposited directly onto the membrane 637A.

In implementations in which the actuator 636A is a piezo actuator that includes a piezo material, the piezo material can have any suitable shape, and such shape can depend on the shape of the membrane 637A. For example, the piezo material can be in the shape of a disk, a square, a rectangle, a cylinder, a tube, or an annulus. In implementations in which the actuator 636A is a piezo actuator, the configuration of the piezo material can be selected based on how the piezo actuator is mounted within the cavity 616A.

While not shown, electrodes can be placed near the piezo material to apply an electric field across the piezo material, and the modulation of the electric field causes the mechanical modulation of the piezo material. The electric field generated by the electrodes can be controlled by the signal from the control system 340.

Figure 6B:
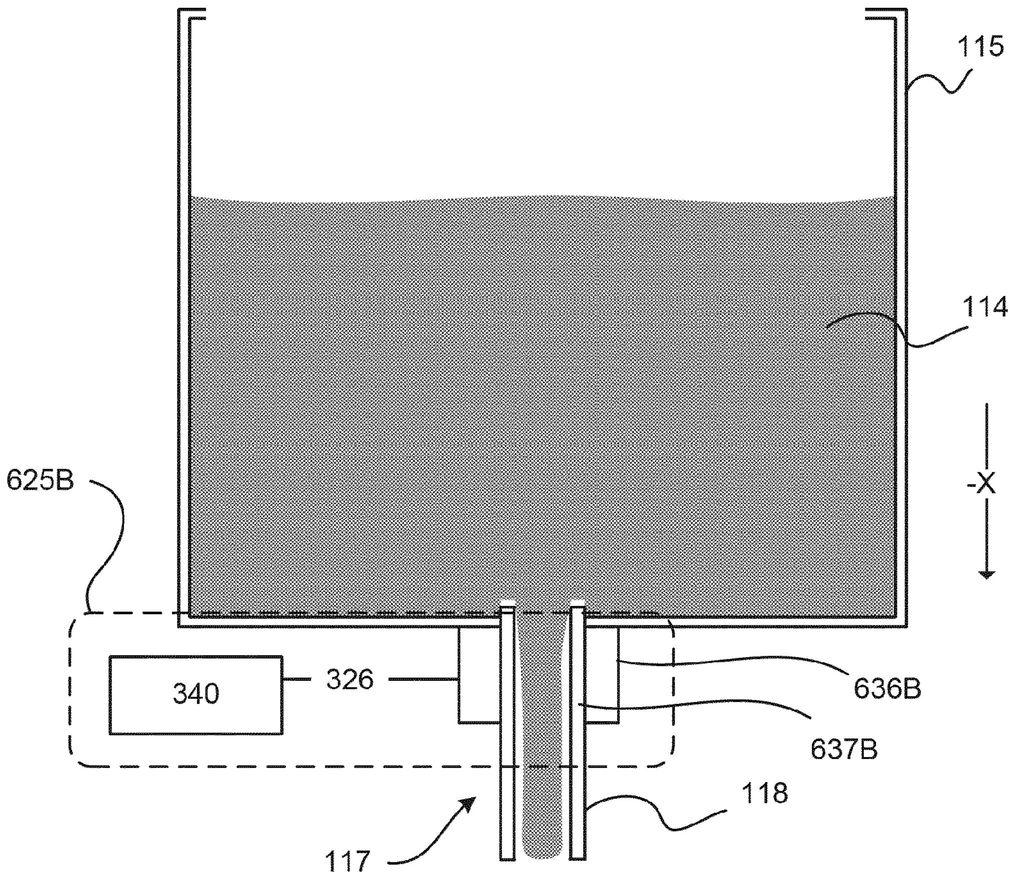
FIG. 6B is a schematic illustration of an implementation of an actuation apparatus of the target apparatus of FIG. 3.

In other implementations of the target generator controller 625B, as shown in FIG. 6B, the actuation apparatus 335 includes an actuator 636B interacting with the nozzle structure 117. For example, a sidewall 637B of the capillary tube 118 is mechanically coupled to the actuator 636B. The actuator 636B can be, for example, a piezo actuator that expands and contracts in response to an applied voltage signal from the control system 340 to thereby cause deformations in the sidewall 637B. By deforming the sidewall 637B, a pressure wave is formed in the target material 114, and the pressure of the target material 114 is modulated. The actuator 636B can be annular with an opening that receives the capillary tube 118 and the actuator 636B can be fixed or attached to the sidewall 637B. For example, the actuator 636B can be glued to the sidewall 637B.

Figure 7:
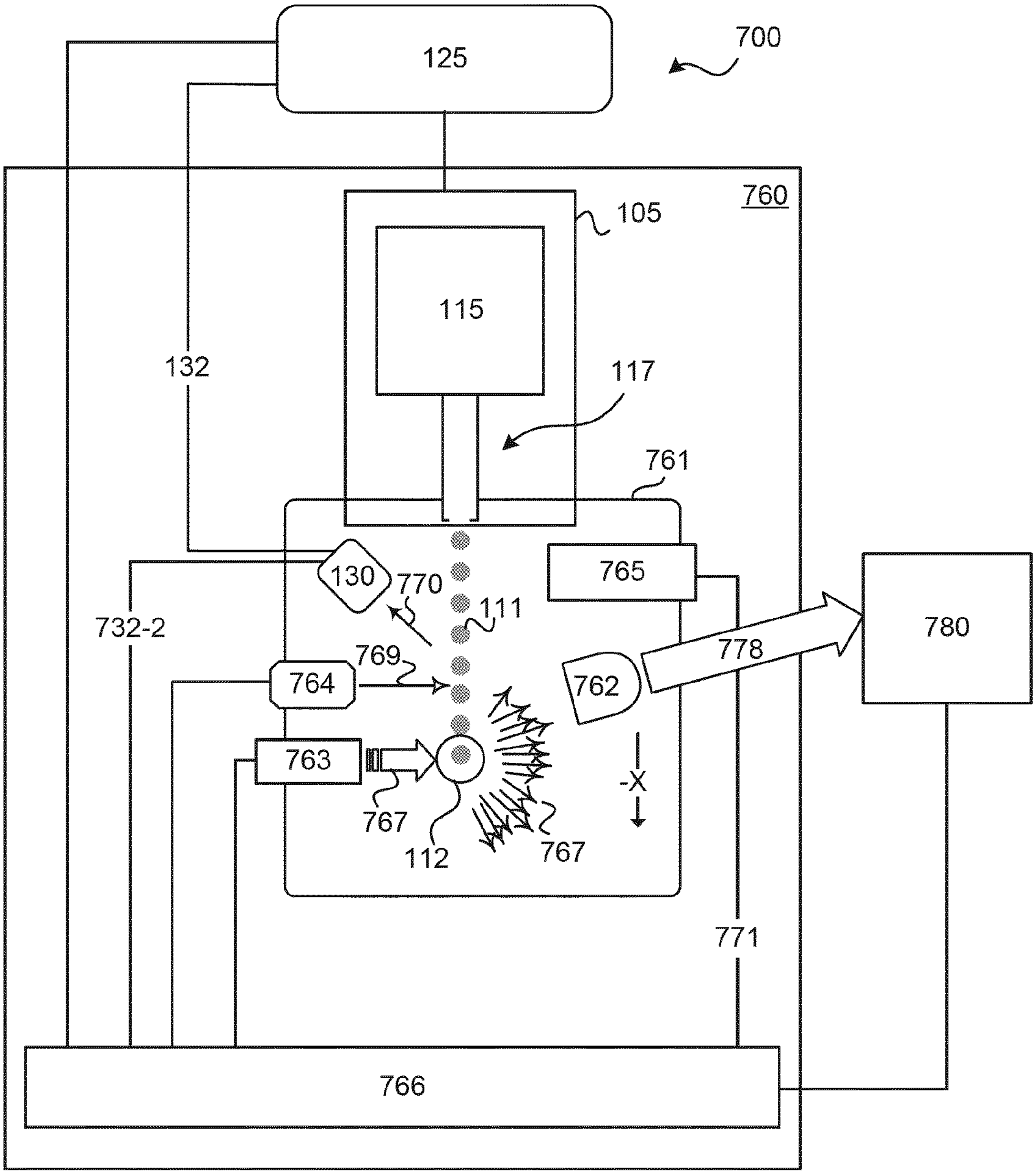
FIG. 7 is a block diagram of an implementation of the target apparatus of FIG. 1A or 3 incorporated into an extreme ultraviolet (EUV) light source that supplies EUV light to an output apparatus.

Referring to FIG. 7, an implementation of the target apparatus 700 is incorporated into an EUV light source 760 that supplies EUV light 778 to an output apparatus 780, which can be a lithography apparatus. The EUV light source 760 includes a vacuum chamber 761 that defines the target space 112.

The EUV light source 760 includes an EUV light collector 762 arranged relative to the target space 112, an optical source 763 producing the one or more radiation pulses 767 directed toward the target space 112, a diagnostic system 764 arranged relative to the target material 114 traveling toward the target space 112, a detection module 765 arranged relative to the target material 114 traveling toward the target space 112, and a control apparatus 766 in communication with the optical source 763, the diagnostic system 764, the detection module 765, the output apparatus 780, and also the sensor module 130.

In general, each of the targets 111 is made up of the target material 114 (which is supplied from the target apparatus 700), and the target material 114 emits EUV light 768 when converted to plasma. Each target 111 is converted at least partially or mostly to plasma through its interaction with the radiation pulses 767 produced by the optical source 763, such interaction occurring in the target space 112. Each target 111 is a target mixture that includes the target material 114 and optionally impurities such as non-target particles. The target material 114 is the substance that is capable of being converted to a plasma state that has an emission line in the EUV range. The target 111 can be, for example, a droplet of liquid or molten metal, a portion of a liquid stream, solid particles or clusters, solid particles contained within liquid droplets, a foam of target material, or solid particles contained within a portion of a liquid stream. The target material 114 can include, for example, water, tin, lithium, xenon, or any material that, when converted to a plasma state, has an emission line in the EUV range. For example, the target material 114 can be the element tin, which can be used as pure tin (Sn); as a tin compound such as SnBr4, SnBr2, SnH4; as a tin alloy such as tin-gallium alloys, tin-indium alloys, tin-indium-gallium alloys, or any combination of these alloys. In the situation in which there are no impurities, then each target 111 includes only the target material 114. The discussion provided herein is an example in which each target 111 is a droplet made of molten metal such as tin. However, each target 111 can take other forms.

The optical source 763 produces one or more beams of radiation pulses 767 that are directed to the target space 112 generally along a direction generally perpendicular to the X axis. The optical source 763 includes one or more light sources that produce the one or more beams of radiation pulses 767, a beam delivery system that includes optical steering components that change a direction or angle of the beam of radiation pulses 767, and a focus assembly that focuses the beam of radiation pulses 767 to the target space 112. Exemplary optical steering components include optical elements such as lenses and mirrors that steer or direct the beam of radiation pulses 767 by refraction or reflection, as needed. The optical source 763 can include an actuation system that is in communication with the control apparatus 766, and the actuation system can be used to control or move the various features optical source 763 including the beam delivery system, the focus assembly, and the light source.

The optical source 763 includes at least one gain medium and an energy source that excites the gain medium to produce the beams of radiation pulses 767. The beam of radiation pulses 767 constitutes a plurality of optical pulses that are separated from each other in time. In other implementations, the beam output from the optical source 763 can be a continuous wave (CW) beam. The optical source 764 can be, for example, a solid-state laser (for example, Nd:YAG laser, an erbium-doped fiber (Er:glass) laser, or a neodymium-doped YAG (Nd:YAG) laser operating at 1070 nm and at 50 W power).

The EUV light collector 762 collects as much EUV light 768 emitted from the plasma as possible and redirects that EUV light 768 as collected EUV light 778 toward the output apparatus 780. The light collector 762 can be a reflective optical device such as a curved mirror that is able to reflect light having EUV wavelength (that is, the EUV light 768) to form the produced EUV light 778.

The diagnostic system 764 is arranged relative to the target material 114 traveling toward the target space 112. The diagnostic system 764 is configured to produce one or more diagnostic probes 769 that diagnostically interact with the targets 111 traveling along a trajectory and before the targets 111 enter the target space 112. In some implementations, the diagnostic system 764 produces, as the one or more diagnostic probes 769, one or more diagnostic light beams. Each diagnostic light beam is directed toward the trajectory TR such that when the target 111 passes across the diagnostic light beam, diagnostic light 770 is produced. In some implementations, the diagnostic light beam has a center wavelength in the near infrared region. For example, the diagnostic light 770 that is produced can be a portion of the diagnostic light beam that is reflected from, scattered from, or passes through the target 111.

Figure 8B:
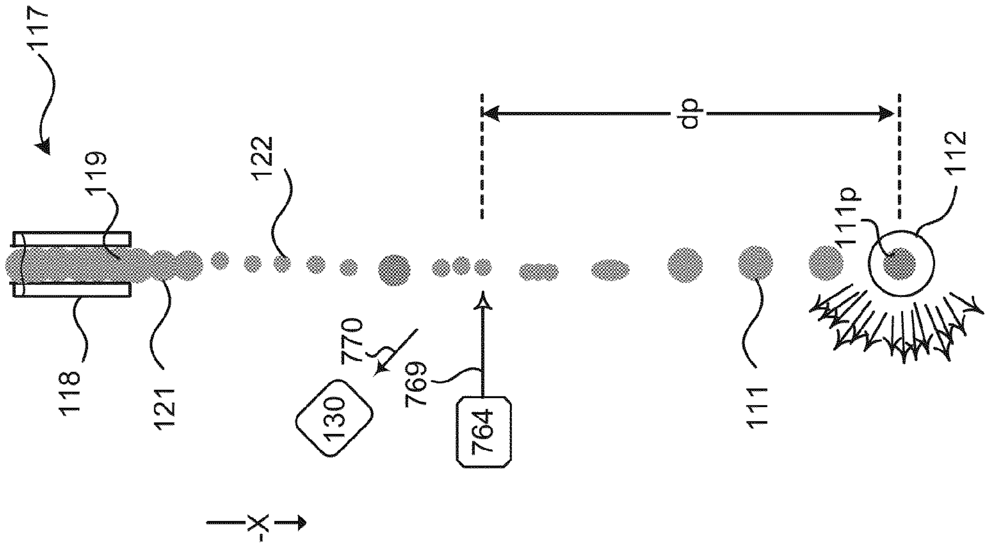
FIG. 8B is a schematic illustration of an implementation showing a diagnostic interaction between a target and one or more diagnostic probes produced by a diagnostic system of the EUV light source of FIG. 7.
Figure 8A:
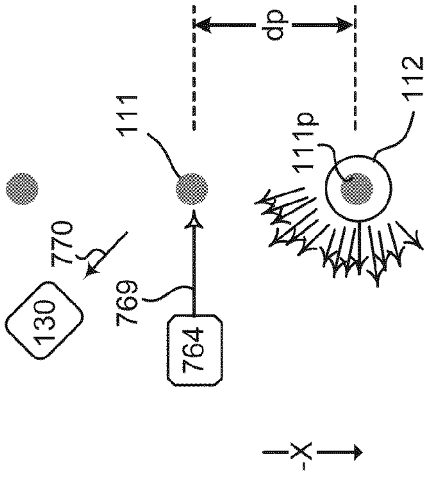
FIG. 8A is a schematic illustration of an implementation showing a diagnostic interaction between a target and one or more diagnostic probes produced by a diagnostic system of the EUV light source of FIG. 7.

Referring also to FIG. 8A, the diagnostic interaction between the target 111 and the one or more diagnostic probes 769 can occur at a diagnostic distance dp away from the target space 112. During a tuning mode of operation (that is, before steady-state operation of the EUV light source 760), the diagnostic distance dp can be less than two times a spacing between adjacent targets 111 formed from the target material 114 traveling along the trajectory. For example, the sensor module 130 can detect the diagnostic light 770 due to an interaction between a target 111 and the diagnostic probe 769 during or after a preceding target 111*p* has entered the target space 112.

In other implementations, as shown in FIG. 8B, the diagnostic interaction between the target material 114 (which can be the sub-targets 122 and/or the targets 111) and the one or more diagnostic probes 769 can be much closer to the opening 119 of the nozzle structure 117. For example, the diagnostic distance dp is positioned about half-way between the opening 119 of the nozzle structure 117 and the target space 112. In these implementations, the sensor module 130 is arranged to detect diagnostic light 770 that is produced at a relatively larger distance away from the target space 112 than what is shown in FIG. 8A. Such an arrangement of the sensor module 130 and the diagnostic probes 769 can be suitable for use during steady-state operation of the EUV light source 760.

During tuning (before steady-state operation of the EUV light source 760), the diagnostic interaction can occur between sub-targets 122 and the one or more diagnostic probes 769 if the location Dc at which the sub-targets 122 coalesce to form the targets 111 is reduced to be on the order of or less than the diagnostic distance dp from the target space 112.

In this implementation, the sensor module 130 is configured to detect the diagnostic light 770, which is an aspect relating to the target material 114. Specifically, the diagnostic light 770 is produced from an interaction between the diagnostic probes 769 and the target material 114 (which can be in the form of the sub-targets 122 or the target 111) as the target material 114 is traveling toward the target space 112. The output signal 132 from the sensor module 130 is provided to the target generator controller 125, as discussed above. Moreover, the sensor module 130 is configured to detect the diagnostic light 770 upon being triggered only by the diagnostic light 770 and without any other external trigger. The sensor module 130 is configured to detect the aspect (which in this example, is the diagnostic light 770) relating to the target material 114 without relying on image processing.

Depending on the arrangement of the diagnostic system 764 and the sensor module 130 relative to the target space 112, a second output signal 732-2 from the sensor module 130 can be provided (independently and separately from being provided to the target generator controller 125) to the control apparatus 766 for other kinds of processing during steady-state operation of the EUV light source 760. The second output signal 732-2 is identical to the output signal 132, except that it follows a distinct and separate pathway from the sensor module 130 to the control apparatus 766. For example, the control apparatus 766 can analyze the second output signal 732-2 from the sensor module 130 to estimate one or more properties (such as the arrival, motion, speed, velocity, and acceleration) of the target 111. The control apparatus 766 can include an optical source control module that is configured to determine how to adjust the optical source 763 to thereby adjust one or more characteristics (such as timing and direction) of the radiation pulses 767 directed toward the target space 112 based on the output from the sensor module 130.

The detection module 765 is arranged relative to the target material 114 traveling toward the target space 112. The detection module 765 can detect two-dimensional aspects relating to the target material 114, and also output a two-dimensional signal relating to the target material 114. An output signal 771 from the detection module 765 is sent to the control apparatus 766. No output signal 771 from the detection module 765 is used by the target generator controller 125 in its analysis. Thus, in various implementations, the target generator controller 125 is not in communication with any detection modules (such as the detection module 765) that output a two-dimensional output signal 771, and does not rely on such two-dimensional output signals.

The target generator controller 125 is in communication with the control apparatus 766. Thus, once the target generator controller 125 sets steady state characteristics of the target generator 105 after determining that the target material 114 is within an acceptable range of properties at the target space 112 based on the analysis of the one-dimensional output signal 132, the target generator controller 125 can notify the control apparatus 766 so that the control apparatus 766 can start operating the EUV light source 760 in steady-state mode to produce the EUV light 778 for the output apparatus 780.

Figure 9:
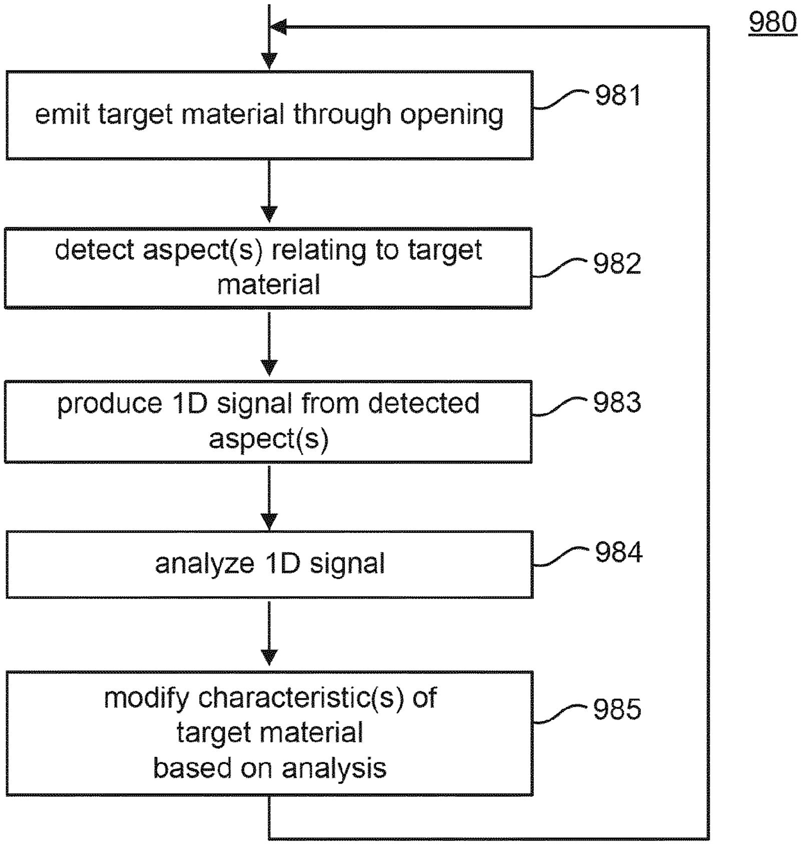
FIG. 9 is a flow chart of a procedure performed by the target apparatus of FIG. 1A, 3, or 7 for controlling target material traveling toward the target space.

Referring to FIG. 9, a procedure 980 is performed by the target apparatus 100 for controlling target material 114 traveling toward the target space 112. In some implementations, the procedure 980 is performed during a tuning mode of operation and prior to using the EUV light source 760 in a steady-state mode of operation. During tuning mode of operation, the EUV light source 760 is not producing the EUV light 778 for use by the output apparatus 780 and the target apparatus 100 is performing operations to determine a set of steady-state performance characteristics associated with the target material 114.

In other implementations, the procedure 980 is performed while the EUV light source 760 is operating in a steady-state mode and therefore is producing the EUV light 778 for use by the output apparatus 780. During steady-state mode of operation, the target apparatus 100 is performing operations to maintain the set of steady-state performance characteristics associated with the target material 114. In such implementations, the sensor module 130 (and diagnostic system 764) can be positioned closer to the nozzle structure 117 to ensure that the information obtained by the target generator controller 125 has enough time to act on the target material 114 before it reaches the target space 112.

Figure 10A:
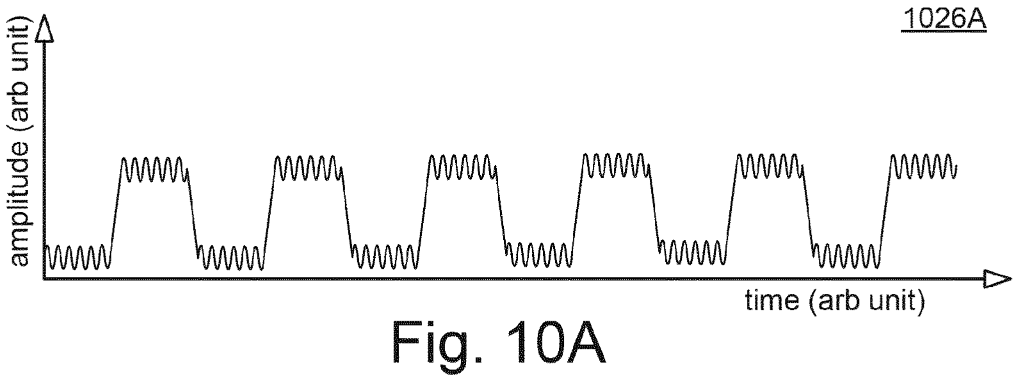
FIGS. 10A-10C are graphs of implementations of driving waveforms supplied to the actuation apparatus from the control system of the target apparatus of FIG. 1A, 3, or 7.
Figure 10B:
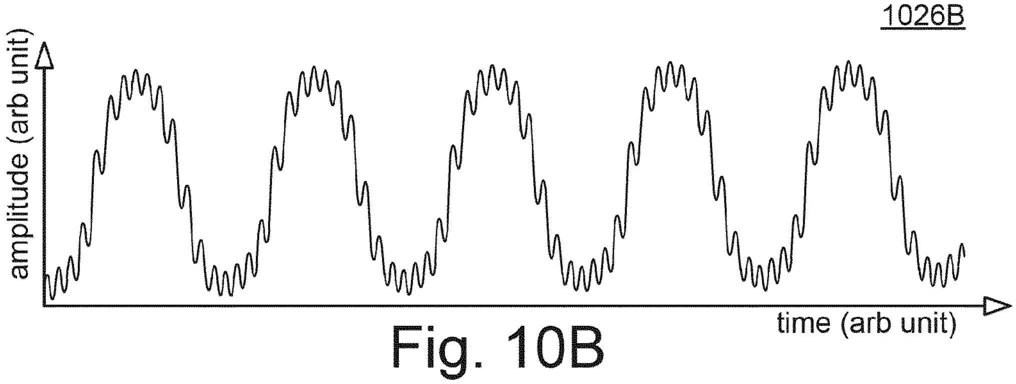

The procedure 980 includes emitting target material 114 through the opening 119 defined in the nozzle structure 117 (981). The target material 114 is emitted (981) in accordance with the driving waveform 326 supplied to the actuation apparatus 335 from the control system 340. Examples 1026A and 1026B of the driving waveform 326 are shown, respectively, in FIGS. 10A and 10B. The driving waveform 326 is an amplitude (such as a voltage) supplied to the actuation apparatus 335 as a function of time (in arbitrary units). The driving waveform 1026A includes a sine wave of a second frequency plus a square wave of first frequency that is less than the second frequency. The driving waveform 1026B includes a sine wave of a second frequency plus another sine wave of a first frequency that is less than the second frequency.

Figure 10C:
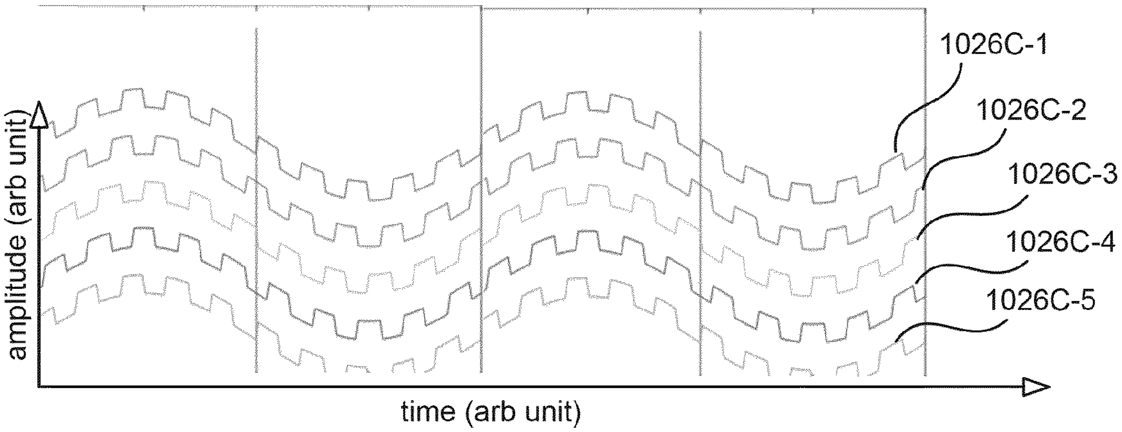

FIG. 10C shows a set of examples 1026C-1, 1026C-2, 1026C-2, 1026C-4, 1026C-5 of the driving waveform 326. Each of the driving waveforms 1026C-1, 1026C-2, 1026C-2, 1026C-4, 1026C-5 shown in FIG. 10C each include a square wave (second frequency component) having a second frequency plus a sine wave (first frequency component) having a first frequency that is less than the second frequency. In particular, the second frequency is about ten times the first frequency. As an example, the first frequency can be about 50 kHz and the second frequency can be about 500 kHz. The phase between the first frequency component (the sine wave) and the second frequency component (the square wave) is varied in each driving waveform 1026C-1, 1026C-2, 1026C-2, 1026C-4, 1026C-5, and this variance in the phase influences the position of a sub-target 122 relative to a target 111 in a stream directed toward the target space 112. The effect of this variance is shown more clearly in FIG. 11C.

Referring again to FIG. 9, the procedure 980 includes detecting one or more aspects relating to the target material 114 that is traveling along the trajectory toward the target space 112 (982) and producing a one-dimensional signal from the detected aspects (983). The sensor module 130 is arranged to detect the one or more aspects relating to the target material 114. Moreover, as discussed above, the location Dc at which the sub-targets 122 coalesce to form the targets 111 depends on the driving waveform 326 that is being supplied to the actuation apparatus 335. Thus, for some driving waveforms 326 (or for certain spectral parameters of the driving waveform 326), the sensor module 130 detects one or more aspects relating to the coalesced targets 111. For other driving waveforms 326 (or for certain spectral parameters of the driving waveform 326), the sensor module 130 detects one or more aspects relating to sub-targets 122 (which can be sub-targets 122-0 or 122-1, or any sub-targets that have not fully coalesced into targets 111). In particular, if the procedure 980 is performed during a tuning mode of operation (before steady-state operation of the EUV light source 760) then the driving waveform 326 is adjusted in a manner that results in adjusting the coalescence location Dc over a range of possible values. In the tuning mode of operation, then, the sensor module 130 is detecting aspects relating to sub-targets 122 and also to targets 111.

For example, the sensor module 130 can detect the diagnostic light 770 that is produced due to the interaction between the target material 114 (such as the sub-targets 122 or the targets 111) and the one or more diagnostic probes 769 as the target material 114 is traveling toward the target space 112. The output signal 132 from the sensor module 130 is a one-dimensional signal such as a measure of the intensity of the diagnostic light 770 as a function of time. Examples 1132A, 1132B of a one-dimensional output signal 132 are shown, respectively, in FIGS. 11A and 11B.

The output signal 1132A shows the intensity of the diagnostic light 770 reflected or scattered from coalesced targets 111-A1, 111-A2, 111-A3 as the coalesced targets interact with the diagnostic probe 769. In this example, the output signal 1132A shows three peaks at times tA1, tA2, and tA3. The peaks at times tA1, tA2, tA3 correspond to the increase in intensity of the diagnostic light 770 that is reflected from the coalesced target 111-A1, 111-A2, 111-A3, respectively. In this example, the driving waveform 326 provided to the actuation apparatus 335 is configured to ensure that the sub-targets 122 coalesce before reaching the diagnostic probe 769 (thus, Dc is greater than dp).

The output signal 1132B shows the intensity of the diagnostic light 770 reflected or scattered from coalesced targets 111-B1, 111-B2, 111-B3 and also from sub-targets 122-B4 and 122-B5. The output signal 1132B exhibits larger peaks at times tB2, tB2, tB3 that correspond to the increase in intensity of the diagnostic light 770 reflected from the respective coalesced targets 111-B1, 111-B2, 111-B3. The output signal 1132B exhibits smaller peaks at times tB4 and tB5 that correspond to the increase in intensity of the diagnostic light 770 reflected from the respective sub-targets 122-B4 and 122-B5, respectively. The peaks at times tB4 and tB5 have a smaller intensity than the peaks at times tB1, tB2, tB3 because the sub-targets 122-B4 and 122-B5 have a relatively smaller surface area that interacts with the diagnostic probe 769.

Figure 11C:
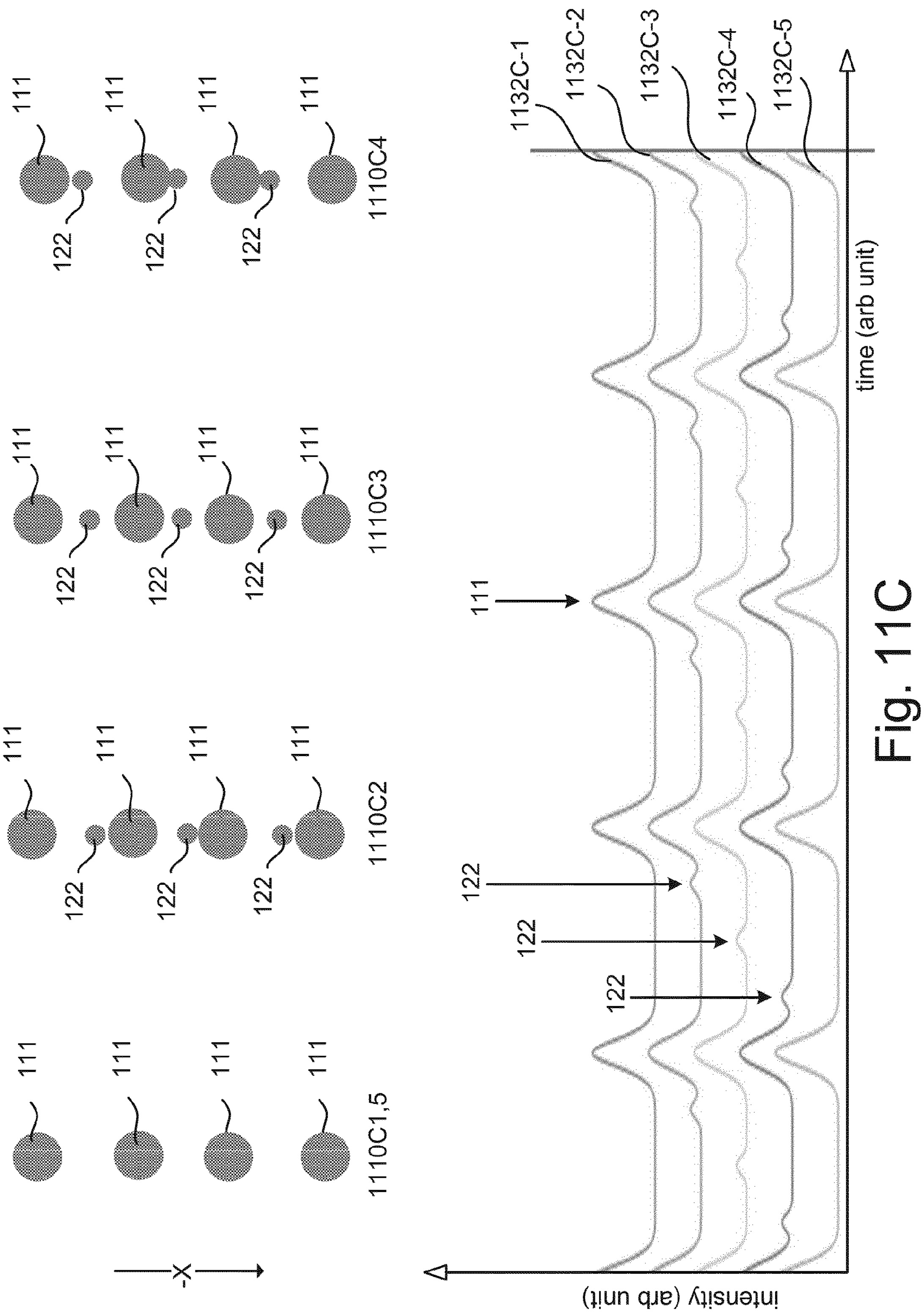
FIG. 11C shows several examples of graphs of an output signal that is produced from a sensor module of the target apparatus of FIG. 1A, 3, or 7, including illustrations of the diagnostic interaction with the target material that produces the output signal, the output signals in FIG. 11C being produced in response to the driving waveforms of FIG. 10C.

In other implementations, and referring to FIG. 11C, a set of one-dimensional output signals 1132C-1, 1132C-2, 1132C-3, 1132C-4, 1132C-5 are output from the sensor module 130. In these implementations, each of the output signals 1132C-1, 1132C-2, 1132C-3, 1132C-4, 1132C-5 corresponds to, respectively, a driving waveform 1026C-1, 1026C-2, 1026C-2, 1026C-4, 1026C-5 that is shown in FIG. 10C. The output signals 1132C-1 and 1132C-5 display a set of peaks with a first amplitude, with each peak of the first amplitude corresponding to a fully-coalesced target 111 (as shown in the schematic illustration of the stream 1110C1,5). The output signals 1132C-2, 1132C-3, 1132C-4 each display a set of peaks having a primary amplitude, and a set of peaks having a secondary amplitude that is smaller than the primary amplitude. The peaks with the primary amplitude correspond to fully-coalesced targets 111 while the peaks of the secondary amplitude correspond to the sub-targets 122. Moreover, the location of the peaks of the secondary amplitude shifts in each of the output signals 1132C-2, 1132C-3, 1132C-4, which indicates that the location of the sub-targets 122 has shifted relative to the targets 111. For example, the output signal 1132C-2 can be produced from the stream 1110C2; the output signal 1132C-3 can be produced from the stream 1110C3; and the output signal 1132C-4 can be produced from the stream 1110C4.

The sensor module 130 (or the signal capture device 349) sends the output signal 132 to the control system 340, which determines the values of the time stamps that correspond to the peaks of the intensity in the output signal 132. For example, the control system 340 determines the time stamps tA1, tA2, tA3 from the output signal 1132A or time stamps tB1-tB5 from the output signal 1132B.

The procedure 980 includes analyzing the one-dimensional signal (984). The shape of the output signal 132 correlates with the amount or intensity of the diagnostic light 770 impinging on a detector of the sensor module 130. Thus, the control system 340 can convert the output signal 132 into a set of values that correspond to maximum intensities of the detected light. For example, the signal processing module 541 in the control system 340 can digitally time stamp each individual voltage peak of the output signal 132. The value of each maximum intensity can be digitally time stamped and then used to determine the one or more moving properties of the target 111. The location of the time stamps (such as time stamps tA1, tA2, tA3 in output signal 1132A) can be selected by the signal processing module 541 to generally correspond to a center location of respective peak. For example, in some implementations, the signal processing module 541 can be configured to low-pass filter a transient peak signal coming from the detector in the sensor module 130 (which can be a photodiode), the signal processing module 541 can determine a time derivative of that filtered signal, and use a zero-crossing of the derivative to estimate where the center of the peak is and then select that location as the time stamp (such as time stamps tA1, tA2, tA3). In other implementations, the signal processing module 541 could select the location of the midpoint of the half-maximum crossings as the location for each time stamp. The shape of the transient peak signal can be different depending on the shape of the target 111 (for example, the targets 111 can undergo shape oscillations as they travel along their trajectory) and thus, the signal processing module 541 can be sensitive to the centroid but not the shape of the transient peak signal in some implementations.

Other aspects of the output signal 542 (such as 1132A and 1132B) can be analyzed by the signal processing module 541. For example, with reference to FIGS. 11A and 11B, the signal processing module 541 can determine whether an amplitude of the output signal 1132A, 1132B is greater than a respective threshold value ValA, ValB. If the output signal 1132A, 1132B is greater than the threshold value ValA, ValB, respectively, then this is an indication that the sensor module 130 has sensed the target material 114. The signal processing module 541 can determine a size (such as an area ArA, ArB, respectively) of the peaks of the output signal 1132A, 1132B that have amplitudes greater than the threshold value ValA, ValB, respectively. The signal processing module 541 can look at the start and end times (for example, StA, StB, EndA, EndB) at which the peaks of the output signal 1132A, 1132B, respectively, crosses the threshold value ValA, ValB, respectively.

The control system 340 can analyze the time stamps from the output signal 132 to determine characteristics of the target material 114 that is traveling along the trajectory toward the target space 112. During steady-state operation, the information that is analyzed can be used to determine an arrival time of the target 111 at a particular position in space such as a region within the target space 112, to estimate a speed, velocity, or acceleration of the target 111, or to estimate a time interval between an arrival of the target 111 at a particular position in space and an arrival of another target at that particular position in space.

The signal processing module 541 can also access other data relating to the target 111 or to the diagnostic system 764 that can be stored in memory 546. For example, the memory 546 can store information relating to a prior velocity associated with the target 111 or a prior target. The memory 546 can store information relating to a spacing between the diagnostic probes if the diagnostic system 764 is designed as a dual-beam diagnostic system or the memory 546 can store the location at which the diagnostic probe 769 interacts with each target 111.

The signal processing module 541 can determine the speed or velocity of the target 111 using the determined time stamps.

The signal processing module 541 can determine the predicted time that the target 111 will be at a location within the target space 112. The signal processing module 541 is able to determine the predicted time of arrival of the target 111 at a location in the target space 112 by using the estimated velocity and other information stored in memory 546.

The output or outputs from the signal processing module 541 can be considered a control signal and is directed to the actuation system, which interfaces with the optical source 763. The control signal from the signal processing module 541 provides instructions that cause the actuation system (interfacing with the optical source 763) to adjust aspects of the optical source 763 to thereby adjust one or more of a timing of a release of one or more radiation pulses 767 and a direction at which the radiation pulse 767 travels.

During a tuning operation, the information that is analyzed can be used to determine whether any of the peaks in the output signal 132 correspond to sub-targets 122 (or not fully coalesced targets 111). For example, the difference in the time stamps between a sub-target 122 and an adjacent other sub-target 122 or target 111 should be less than the difference in time stamps between two adjacent targets 111. This is evident from the output signal 1132B. Thus, the difference tB1−tB2>tB1−tB4.

Figure 12:
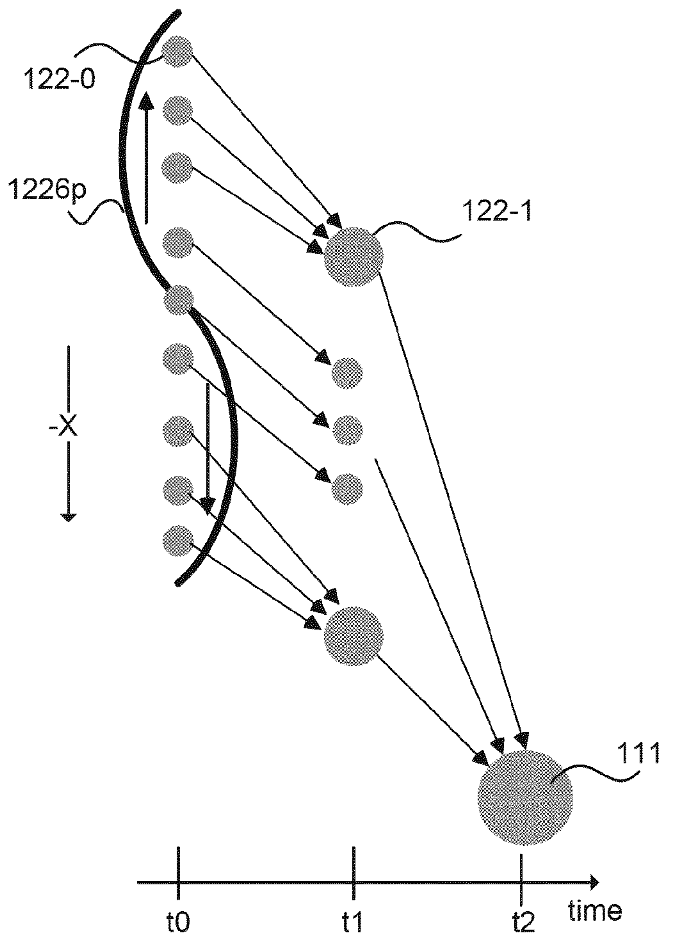
FIG. 12 is a schematic illustration of an implementation of a frequency component of a driving waveform produced supplied to the actuation apparatus of FIG. 1A, 3, or 7, and shown with target material produced from the driving waveform.

As an example, as shown in FIG. 12, certain shapes and parameters of the driving waveform 326 can be configured to delay coalescences of the sub-targets 122. One way to do this is to impose a perturbation such as a sine wave (at a third frequency) 1226*p* on top of the coalescence signal at the first frequency. By changing parameters of this perturbation sine wave such as the phase and amplitude of the perturbation sine wave 1226*p*, coalescence can be altered (delayed or sped up) so that the perturbation sine wave at the third frequency cancels out the coalescence signal at the first frequency. If the perturbation sine wave 1226*p* at the third frequency is of sufficient amplitude, then the coalescence can be prevented altogether, and the sub-targets 122 can be detected by the sensor module 130. For example, the perturbation sine wave in the driving waveform 326 can be timed so that sub-targets 122 are emitted to coincide with a largest velocity gradient of the pressure wave 454 (that results from the perturbation sine wave 1226*p* of the driving waveform 326). By doing this, the sub-targets 122 near this large velocity gradient are less likely to move toward each other (because their velocities are not modified by the coalescence signal at the first frequency in the driving waveform 326) and therefore they remain un-coalesced at time t1. The information gleaned about the sub-targets 122 can be used by the signal processing module 541 to optimize or improve coalescence.

The procedure 980 includes modifying one or more characteristics of the target material 114 that is emitted from the opening 119 based on the analysis of the one-dimensional signal (985). Thus, when the procedure 980 is performed while the EUV light source 760 is operating in steady-state mode, then at this step, the control system 340 can modify parameters associated with the driving waveform 326 supplied to the actuation apparatus 335, and by making such modifications, the behavior of the target material 114 emitted from the opening 119 is modified, with the goal being to maintain the set of steady-state performance characteristics associated with the target material 114. When the procedure 980 is performed during tuning mode (in which the EUV light source 760 is in standby mode and is not operating in steady-state mode), then the control system 340 modifies parameters (such as wavelength or frequency and phase) associated with the driving waveform 326 supplied to the actuation apparatus 335 to probe other aspects related to the target material 114 at 982. The modification to the target material 114 can be to change the velocity at which the target material 114 is released from the opening 119, such as to change when or where coalescence occurs.

Figure 13:
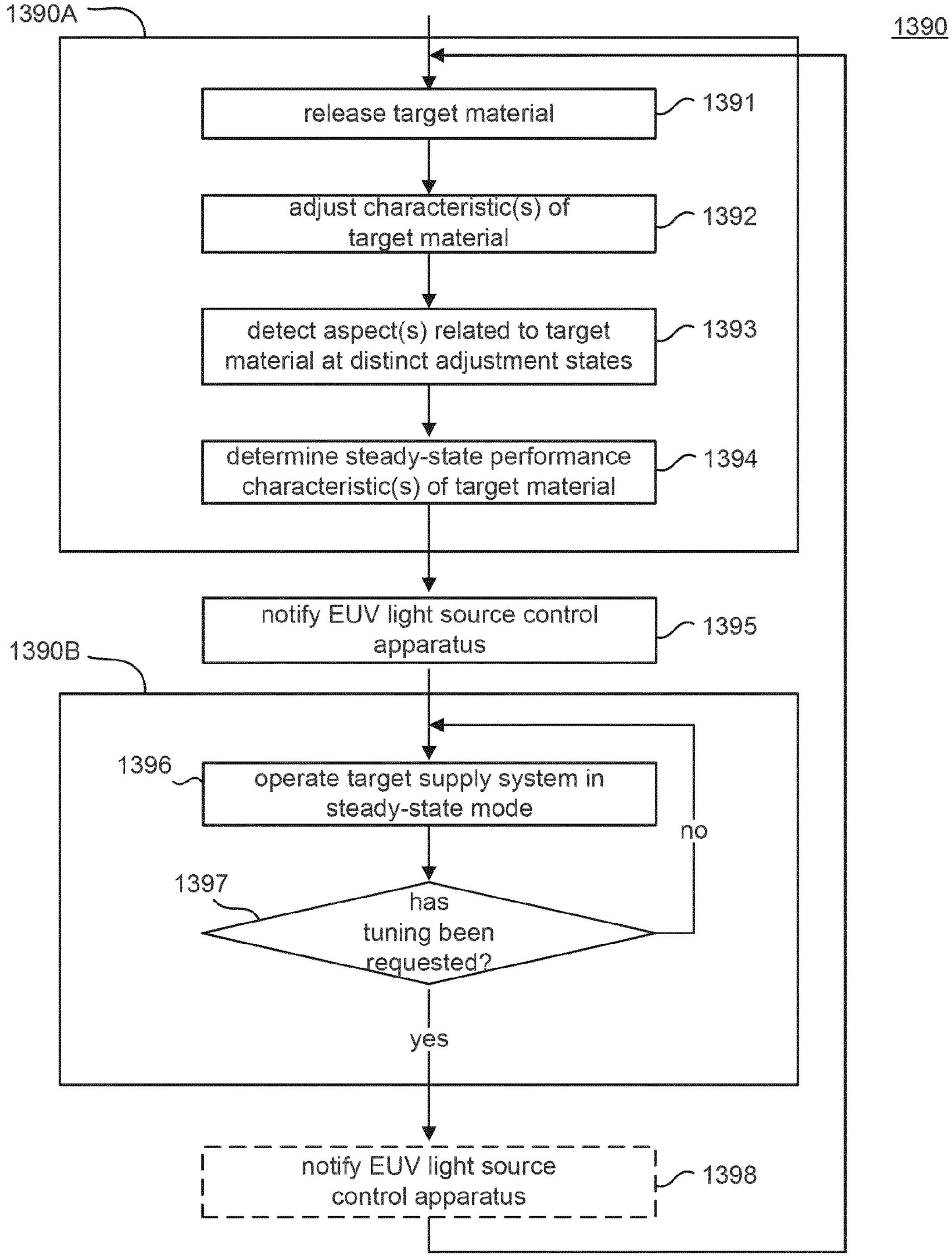
FIG. 13 is a flow chart of a procedure performed by the target apparatus of FIG. 1A, 3, or 7 for tuning the target apparatus for use in an EUV light source such as the EUV light source of FIG. 7.

Referring to FIG. 13, a procedure 1390 is performed to tune the target apparatus (such as the target apparatus 100 or 700). While discussing the procedure 1390, reference is made to the target apparatus 700 of FIG. 7. Initially, the target apparatus 700 is operated in a tuning mode 1390A and once the tuning mode 1390A is completed, the target apparatus 700 begins operating in steady-state mode 1390B.

During tuning mode 1390A, the target material 114 is released from the nozzle structure 117 along the trajectory toward the target space 112 (1391). This is discussed above with respect to step 981. Next, one or more characteristics of the target material 114 (that is released from the nozzle structure 117) are adjusted (1392). For example, the location Dc and time at which sub-targets 122 made of the target material 114 coalesce into targets 111 can be adjusted at step 1392. This adjustment can happen under control of the control system 340, which modifies the driving waveform 326 supplied to the actuation apparatus 335 (and by modifying this driving waveform 326 the characteristics of the target material 114 are modified).

The procedure 1390 next includes detecting one or more aspects relating to the target material 114 as the target material travels toward the target space 112 (1393). This is discussed above with respect to step 982. In particular, because the target apparatus 700 is being tuned (1390A) at this stage, this detection 1393 occurs at a plurality of different states of adjustment (set at 1392) to determine a set of steady-state performance characteristics associated with the target material 114 (1394).

Once the steady-state performance characteristics associated with the target material 114 are determined (1394), then the EUV light source 760 can begin operating in steady-state mode. Thus, the target apparatus 700 notifies the EUV light source 760 that the target apparatus 700 is operating in steady-state mode (1395). For example, the target apparatus 700 (by way of the target generator controller 125) can send a signal to the control apparatus 766 so that the control apparatus 766 can start operating the EUV light source 760 in steady-state mode to produce the EUV light 778 for the output apparatus 780. In steady-state mode 1390B, the target apparatus 700 operates in steady-state mode (1396), and continually queries whether tuning has been requested (1397). If an operator or some external command requests that the target apparatus 700 be tuned (1397), then the target apparatus 700 can notify the EUV light source 760 (if needed) that steady-state mode 1390B will halt (1398).

Figure 14:
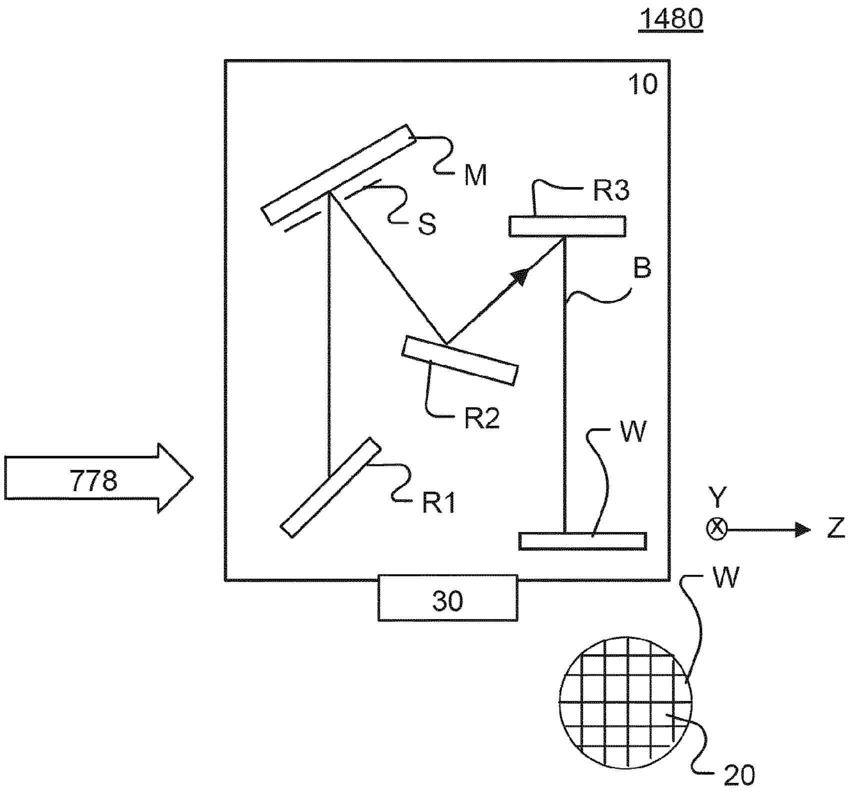
FIG. 14 is a block diagram of an implementation of an output apparatus that receives the EUV light from the EUV light source of FIG. 7.

Referring to FIG. 14, an implementation 1480 of the lithography apparatus 780 is shown. The lithography apparatus 1480 exposes a substrate (which can be referred to as a wafer) W with an exposure beam B. The lithography apparatus 1480 includes a plurality of reflective optical elements R1, R2, R3, a mask M, and a slit S, all of which are in an enclosure 10. The enclosure 10 is a housing, tank, or other structure that is capable of supporting the reflective optical elements R1, R1, R2, the mask M, and the slit S, and is also capable of maintaining an evacuated space within the enclosure 10.

The EUV light 778 enters the enclosure 10 and is reflected by the optical element R1 through the slit S toward the mask M. The slit S partly defines the shape of the distributed light used to scan the substrate W in a lithography process. The dose delivered to the substrate W or the number of photons delivered to the substrate W depends on the size of the slit S and the speed at which the slit S is scanned.

The mask M also may be referred to as a reticle or patterning device. The mask M includes a spatial pattern that represents the features that are to be formed in a photoresist on a substrate W. The EUV light 778 interacts with the mask M. The interaction between the EUV light 778 and the mask M results in the pattern of the mask M being imparted onto the EUV light 778 to form the exposure beam B. The exposure beam B passes through the slit S and is directed to the substrate W by the optical elements R2 and R3. An interaction between the substrate W and the exposure beam B exposes the pattern of the mask M onto the substrate W, and the photoresist features are thereby formed at the substrate W. The substrate W includes a plurality of portions 20 (for example, dies). The area of each portion 20 in the Y-Z plane is less than the area of the entire substrate W in the Y-Z plane. Each portion 20 may be exposed by the exposure beam B to include a copy of the mask M such that each portion 20 includes the electronic features indicated by the pattern on the mask M.

The lithography apparatus 1480 can include a lithography control system 30 that is in communication with the control apparatus 766 of the EUV light source 760.

Other aspects of the invention are set out in the following numbered clauses.

1. A target apparatus for an extreme ultraviolet (EUV) light source, the target apparatus comprising:
   - a target generator including a reservoir configured to contain target material that produces EUV light when in a plasma state and a nozzle structure in fluid communication with the reservoir, the target generator defining an opening in the nozzle structure, the opening being suitable to release the target material received from the reservoir;
   - a sensor module configured to:
   - detect an aspect relating to target material released from the opening as the target material travels along a trajectory toward a target space, and
   - produce a one-dimensional signal from the detected aspect; and
   - a target generator controller in communication with the sensor module and the target generator, the target generator controller configured to modify characteristics of the target material based on an analysis of the one-dimensional signal.

2. The target apparatus of clause 1, wherein the nozzle structure comprises a capillary that defines the opening, and the opening extends along a longitudinal direction of the capillary.

3. The target apparatus of clause 2, wherein the target generator controller comprises an actuation apparatus configured to perturb a rate at which the target material is released through the opening.

4. The target apparatus of clause 3, wherein the actuation apparatus comprises a piezoelectric inducer configured to apply pressure to target material in the form of fluid in the reservoir, and the target generator controller is configured to change a signal supplied to the piezoelectric inducer to change the pressure applied to the fluid target material, which causes the rate at which the target material is released through the opening to be perturbed.

5. The target apparatus of clause 1, wherein the target generator controller comprises: a control system configured to generate a driving waveform based on the analysis of the one-dimensional signal, and an actuation apparatus in communication with the control system and interacting with the target material, wherein the actuation apparatus is configured to modify the characteristics of the target material in accordance with the driving waveform from the control system.

6. The target apparatus of clause 5, wherein the control system is programmable and is configured to generate a periodic driving waveform.

7. The target apparatus of clause 5, wherein the control system is configured to modify aspects of the driving waveform including modifying one or more of one or more frequencies of the driving waveform and one or more phases of the driving waveform and the rate at which the driving waveform is modified is about 100-500 different waveforms per second.

8. The target apparatus of clause 1, wherein the sensor module comprises one or more photodiodes, the output of each is a voltage signal related to current produced from the detected light; photo-transistors, light-dependent resistors, and photomultiplier tubes.

9. The target apparatus of clause 1, wherein the target generator controller is not in communication with any detection modules configured to output a two-dimensional signal relating to the formed target.

10. The target apparatus of clause 1, wherein the sensor module is, independently from the communication with the target generator controller, in communication with an optical source controller that is configured to adjust one or more characteristics of radiation pulses directed toward the target space.

11. The target apparatus of clause 1, wherein the target generator controller has a sampling rate of at least 5 MHz.

12. The target apparatus of clause 1, wherein the sensor module is configured to detect light produced from an interaction between the target material and a light curtain directed to cross the trajectory.

13. The target apparatus of clause 12, wherein the sensor module is configured to detect the aspect relating to the target material upon being triggered only by the interaction between the target material and the light curtain.

14. The target apparatus of clause 1, wherein the sensor module is configured to detect the aspect relating to the target material without relying on image processing and/or without relying on a trigger signal.

15. The target apparatus of clause 1, wherein the target generator is configured to release the target material according to a driving waveform supplied by the target generator controller, the target material traveling along the trajectory, at least some of the target material in the form of separate masses coalescing to form the targets at the target space.

16. The target apparatus of clause 1, further comprising a diagnostic system configured to diagnostically interact with target material traveling along the trajectory and before the target material enters the target space, wherein the sensor module is positioned to detect the aspect relating to the target material that relates to the diagnostic interaction between the target material and the diagnostic system.

17. The target apparatus of clause 16, wherein the diagnostic interaction occurs at a diagnostic distance away from the target space, the diagnostic distance being less than two times the spacing between adjacent targets formed from the target material traveling along the trajectory or halfway between the opening of the nozzle structure and the target space.

18. The target apparatus of clause 1, wherein the target generator controller is configured to set steady-state characteristics of the target generator after determining that the target material is within an acceptable range of properties at the target space based on the analysis of the one-dimensional signal.

19. The target apparatus of clause 18, wherein the target generator controller is also in communication with a control apparatus of the EUV light source, and is configured to notify the control apparatus once the steady state characteristics of the target generator are set.

20. A method of controlling target material traveling along a trajectory toward a target space in a chamber of an extreme ultraviolet (EUV) light source, the method comprising:

- emitting target material through a longitudinal opening defined in a nozzle, the opening being fluidly coupled to a reservoir configured to contain the target material, wherein the target material produces EUV light when in a plasma state;
- detecting an aspect relating to the target material as the target material travels along the trajectory toward the target space;
- producing a one-dimensional signal from the detected aspect;
- analyzing the one-dimensional signal; and
- modifying one or more characteristics of the emitted target material based on the analysis of the one-dimensional signal.

21. The method of clause 20, wherein emitting target material through the opening defined in the nozzle comprises releasing target material in the form of liquid through the opening.

22. The method of clause 21, wherein emitting target material through the opening causes one or more particles of target material traveling toward the target space to coalesce into one or more targets before reaching the target space.

23. The method of clause 20, wherein modifying one or more characteristics of the emitted target material comprises modifying parameters related to a velocity at which target material is released from the nozzle.

24. The method of clause 23, wherein modifying parameters related to the velocity at which the target material is released from the nozzle comprises modifying a driving waveform supplied to an actuation apparatus in fluid communication with the target material in the reservoir.

25. The method of clause 24, wherein modifying the driving waveform supplied to the actuation apparatus in fluid communication with the target material in the reservoir comprises producing pressure waves in the target material in the reservoir.

26. The method of clause 20, wherein modifying the one or more characteristics of the emitted target material comprises modifying the one or more characteristics at a rate of 100-500 Hz.

27. The method of clause 20, wherein detecting the aspect relating to the target material comprises detecting light produced from an interaction between the target material and a diagnostic probe.

28. The method of clause 27, wherein detecting the aspect relating to the target material comprises detecting the light upon being triggered only by the interaction between the target material and the diagnostic probe.

29. The method of clause 27, wherein producing the one-dimensional signal from the detected light comprises producing a voltage signal from current produced from the detected light.

30. The method of clause 20, wherein analyzing the one-dimensional signal comprises determining one or more moving properties of the target material.

31. The method of clause 20, wherein modifying the one or more characteristics of the emitted target material comprises modifying the one or more characteristics independently of any analysis relating to a two-dimensional signal relating to the target material.

32. The method of clause 20, wherein detecting the aspect relating to the target material is independent of image processing.

33. The method of clause 20, wherein detecting the aspect relating to the target material is independent from a trigger signal related to radiation pulses directed toward the target space.

34. The method of clause 20, further comprising determining whether one or more characteristics of the target material are within an acceptable range at the target space based on the analysis of the one-dimensional signal and notifying a control apparatus of the EUV light source when it is determined that the one or more characteristics of the target material are within the acceptable range at the target space.

35. The method of clause 34, further comprising maintaining the one or more characteristics of the target material within the acceptable range.

36. The method of clause 34, wherein determining whether one or more characteristics of the target material are within an acceptable range at the target space comprises determining that the target material coalesces into targets having acceptable shapes prior to entering the target space.

37. A method of tuning a target apparatus for an extreme ultraviolet (EUV) light source, the method comprising:

- operating the target apparatus including a nozzle in fluid communication with a reservoir in tuning mode, the tuning mode operating comprising:
- releasing target material from the nozzle along a trajectory toward the target space, wherein the target material produces EUV light when in a plasma state;
- adjusting a state of the target material that is released from the nozzle including adjusting one or more characteristics of the target material including adjusting one or more of a location and a time at which target material coalesces into targets along the trajectory prior to entering the target space;

38. The method of clause 37, wherein detecting one or more aspects related to the target material as the target material travels along the trajectory toward the target space comprises detecting one or more aspects related to the target material before the target material coalesces into targets.

39. The method of clause 37, wherein detecting one or more aspects related to the target material as the target material travels along the trajectory toward the target space comprises detecting one or more aspects related to targets that are formed from coalesced target material.

40. The method of clause 37, wherein adjusting one or more characteristics of the target material that is released from the nozzle includes adjusting the one or more characteristics at a rate of about 100-500 Hz.

The invention claimed is:

1. A target apparatus for an extreme ultraviolet (EUV) light source, the target apparatus comprising:

- a target generator including a reservoir configured to contain target material that produces EUV light when in a plasma state and a nozzle structure in fluid communication with the reservoir, the target generator defining an opening in the nozzle structure, the opening being suitable to release the target material received from the reservoir;
- a diagnostic system configured to diagnostically interact with target material traveling along a trajectory toward a target space and before the target material enters the target space;
- a sensor module configured to:
  - detect an aspect relating to a diagnostic interaction between the target material and the diagnostic system, and
  - produce a one-dimensional signal from the detected aspect; and
- a target generator controller in communication with the sensor module and the target generator, the target generator controller configured to modify characteristics of the target material based on an analysis of the one-dimensional signal;
- wherein the diagnostic interaction occurs at a diagnostic distance away from the target space, the diagnostic distance being less than two times the spacing between adjacent targets formed from the target material traveling along the trajectory or halfway between the opening of the nozzle structure and the target space.

2. The target apparatus of claim 1, wherein the nozzle structure comprises a capillary that defines the opening, and the opening extends along a longitudinal direction of the capillary.

3. The target apparatus of claim 2, wherein the target generator controller comprises an actuation apparatus configured to perturb a rate at which the target material is released through the opening.

4. The target apparatus of claim 3, wherein the actuation apparatus comprises a piezoelectric inducer configured to apply pressure to target material in the form of fluid in the reservoir, and the target generator controller is configured to change a signal supplied to the piezoelectric inducer to change the pressure applied to the fluid target material, which causes the rate at which the target material is released through the opening to be perturbed.

5. The target apparatus of claim 1, wherein the target generator controller comprises: a control system configured to generate a driving waveform based on the analysis of the one-dimensional signal, and an actuation apparatus in communication with the control system and interacting with the target material, wherein the actuation apparatus is configured to modify the characteristics of the target material in accordance with the driving waveform from the control system.

6. The target apparatus of claim 5, wherein the control system is configured to modify aspects of the driving waveform including modifying one or more of one or more frequencies of the driving waveform and one or more phases of the driving waveform and the rate at which the driving waveform is modified is about 100-500 different waveforms per second.

7. The target apparatus of claim 1, wherein the sensor module is, independently from the communication with the target generator controller, in communication with an optical source controller that is configured to adjust one or more characteristics of radiation pulses directed toward the target space.

8. The target apparatus of claim 1, wherein the sensor module is configured to detect light produced from an interaction between the target material and a light curtain directed to cross the trajectory.

9. The target apparatus of claim 1, wherein the target generator is configured to release the target material according to a driving waveform supplied by the target generator controller, the target material traveling along the trajectory, at least some of the target material in the form of separate masses coalescing to form the targets at the target space.

10. The target apparatus of claim 1, wherein the target generator controller is configured to set steady-state characteristics of the target generator after determining that the target material is within an acceptable range of properties at the target space based on the analysis of the one-dimensional signal.

11. A method of controlling target material traveling along a trajectory toward a target space in a chamber of an extreme ultraviolet (EUV) light source, the method comprising:

- emitting target material through a longitudinal opening defined in a nozzle, the opening being fluidly coupled to a reservoir configured to contain the target material, wherein the target material produces EUV light when in a plasma state;
- diagnostically interacting one or more diagnostic light beams with target material traveling along the trajectory and at a diagnostic distance away from the target space, the diagnostic distance being less than two times the spacing between adjacent targets formed from the target material traveling along the trajectory or halfway between the longitudinal opening of the nozzle and the target space;
- detecting an aspect relating to a diagnostic interaction between the target material and the one or more diagnostic light beams;
- producing a one-dimensional signal from the detected aspect;
- analyzing the one-dimensional signal; and
- modifying one or more characteristics of the emitted target material based on the analysis of the one-dimensional signal.

12. The method of claim 11, wherein emitting target material through the opening defined in the nozzle comprises releasing target material in the form of liquid through the opening.

13. The method of claim 12, wherein emitting target material through the opening causes one or more particles of target material traveling toward the target space to coalesce into one or more targets before reaching the target space.

14. The method of claim 11, wherein modifying one or more characteristics of the emitted target material comprises modifying parameters related to a velocity at which target material is released from the nozzle.

15. The method of claim 14, wherein modifying parameters related to the velocity at which the target material is released from the nozzle comprises modifying a driving waveform supplied to an actuation apparatus in fluid communication with the target material in the reservoir.

16. The method of claim 15, wherein modifying the driving waveform supplied to the actuation apparatus in fluid communication with the target material in the reservoir comprises producing pressure waves in the target material in the reservoir.

17. The method of claim 11, wherein detecting the aspect relating to the target material comprises detecting light produced from an interaction between the target material and a diagnostic probe.

18. The method of claim 17, wherein detecting the aspect relating to the target material comprises detecting the light upon being triggered only by the interaction between the target material and the diagnostic probe.

19. The method of claim 11, wherein analyzing the one-dimensional signal comprises determining one or more moving properties of the target material.

20. The method of claim 11, wherein modifying the one or more characteristics of the emitted target material comprises modifying the one or more characteristics independently of any analysis relating to a two-dimensional signal relating to the target material.

21. The method of claim 11, wherein detecting the aspect relating to the target material is independent of image processing.

22. The method of claim 11, wherein detecting the aspect relating to the target material is independent from a trigger signal related to radiation pulses directed toward the target space.

23. The method of claim 11, further comprising determining whether one or more characteristics of the target material are within an acceptable range at the target space based on the analysis of the one-dimensional signal and notifying a control apparatus of the EUV light source when it is determined that the one or more characteristics of the target material are within the acceptable range at the target space.

24. The method of claim 23, wherein determining whether one or more characteristics of the target material are within an acceptable range at the target space comprises determining that the target material coalesces into targets having acceptable shapes prior to entering the target space.

25. The target apparatus of claim 1, wherein the sensor module comprises one or more photodiodes, the output of each is a voltage signal related to current produced from the detected light; photo-transistors; light-dependent resistors; and photomultiplier tubes.

26. The target apparatus of claim 1, wherein the target generator controller is not in communication with any detection modules configured to output a two-dimensional signal relating to the formed target.

27. A target apparatus for an extreme ultraviolet (EUV) light source, the target apparatus comprising:

a target generator including a reservoir configured to contain target material that produces EUV light when in a plasma state and a nozzle structure in fluid communication with the reservoir, the target generator defining an opening in the nozzle structure, the opening being suitable to release the target material received from the reservoir, wherein the target generator controller has a sampling rate of at least 5 MHz;

a sensor module configured to:

detect an aspect relating to target material released from the opening as the target material travels along a trajectory toward a target space, and produce a one-dimensional signal from the detected aspect; and a target generator controller in communication with the sensor module and the target generator, the target generator controller configured to modify characteristics of the target material based on an analysis of the one-dimensional signal.

28. The target apparatus of claim 1, wherein the sensor module is configured to detect the aspect relating to the target material without relying on image processing and/or without relying on a trigger signal.

29. The target apparatus of claim 5, wherein the control system is programmable and is configured to generate a periodic driving waveform.

30. The target apparatus of claim 1, wherein the diagnostic system is configured to produce one or more diagnostic light beams configured to diagnostically interact with the target material.

31. The target apparatus of claim 1, wherein the target generator controller comprises:

an actuation apparatus configured to perturb a rate at which target material is released through the opening; and a control system configured to provide a driving signal to the actuation apparatus, the driving signal including a plurality of components at different frequencies.

32. The method of claim 11, wherein emitting target material through the longitudinal opening comprises perturb a rate at which target material is released through the longitudinal opening in accordance with a driving waveform that includes a plurality of components at different frequencies.

33. The method of claim 32, wherein modifying the one or more characteristics of the emitted target material comprises modifying the driving waveform supplied.

* * * * *